United States Patent

Wada

[11] Patent Number: 5,924,512
[45] Date of Patent: *Jul. 20, 1999

[54] OMNIDIRECTIONAL VEHICLE AND METHOD OF CONTROLLING THE SAME

[75] Inventor: Masayoshi Wada, Kawasaki, Japan

[73] Assignee: Fuji Electric Co., Ltd., Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/570,565

[22] Filed: Dec. 11, 1995

[30] Foreign Application Priority Data

Dec. 14, 1994 [JP] Japan .................................. 6-333021
Oct. 9, 1995 [JP] Japan .................................. 7-288014

[51] Int. Cl.$^6$ .................................................. B62D 7/08
[52] U.S. Cl. ........................ 180/253; 180/402; 180/23; 180/6.28
[58] Field of Search .................................. 180/252, 253, 180/263, 264, 265, 408, 411, 402, 22, 23, 24, 6.2, 6.24, 6.28, 6.48, 6.5, 6.6, 6.62

[56] References Cited

U.S. PATENT DOCUMENTS

| 3,404,746 | 10/1968 | Slay | 180/23 |
|---|---|---|---|
| 3,920,093 | 11/1975 | Moran et al. | 180/253 X |
| 4,057,158 | 11/1977 | Lissy | 214/330 |
| 4,221,273 | 9/1980 | Finden | 180/23 X |
| 4,529,052 | 7/1985 | Imai et al. | 180/23 X |
| 4,616,730 | 10/1986 | Strehler et al. | 180/253 |
| 4,683,973 | 8/1987 | Honjo et al. | 180/252 |
| 4,823,899 | 4/1989 | Ron | 180/411 |
| 5,183,133 | 2/1993 | Roy et al. | 180/23 X |
| 5,325,935 | 7/1994 | Hirooka et al. | 180/411 X |
| 5,487,437 | 1/1996 | Avitan | 180/6.28 X |
| 5,547,038 | 8/1996 | Madwed | 180/253 |
| 5,609,220 | 3/1997 | Moriya et al. | 180/253 |

FOREIGN PATENT DOCUMENTS

| 1 580 735 | 10/1970 | Germany . | |
|---|---|---|---|
| 52-51633 | 4/1977 | Japan | 180/253 |
| 61-285129 | 12/1986 | Japan | 180/253 |
| 62-12420 | 1/1987 | Japan | 180/253 |
| 62-33989 | 7/1987 | Japan . | |
| 2-42717 | 2/1990 | Japan . | |
| 2-158460 | 6/1990 | Japan . | |
| 2-249769 | 10/1990 | Japan . | |
| 2-235762 | 10/1991 | Japan | 180/253 |
| 2 276 854 | 10/1994 | United Kingdom . | |

OTHER PUBLICATIONS

West et al., "Design and Control of Ball Wheel Omnidirectional Vehicles", IEEE International Conference on Robotics and Automation, pp. 1931–1938, (1995).

West et al., "Design of a Holonomic Omnidirectional Vehicle", IEEE International Conference on Robotics and Automation, pp. 97–103, (1992.).

Killough et al., "Design of an Omnidirectional and Holonomic Wheeled Platform Prototype", IEEE International Conference on Robotics and Automation, pp. 84–90, (1992).

Hirose et al., "The VUTON: High Payload, High Efficiency Holonomic Omni–Directional Vehicle", No. 930–40, pp. 350–355 (1993).

*Primary Examiner*—Kevin Hurley
*Attorney, Agent, or Firm*—Finnegan, Henderson, Farabow, Garrett & Dunner, L.L.P.

[57] ABSTRACT

An omnidirectional vehicle supports the steering shaft M of the driving wheel 1 serving also as a steering wheel through the shaft stub 8 on the body 7 at the point displaced by a distance S horizontally from the ground contact point of the driving wheel 1, turns the driving wheel 1 by the motor 5 and rotates the steering shaft M by the motor 12 to translate the body 7 back and forth as well as sidewise as desired. The vehicle is controlled to move on the reference trajectory based on the ratio of the angular velocity of the driving wheel 1 and the angular velocity of the steering shaft M. The ratio is calculated based on the position and orientation of the body 7 and the steering angle of the steering shaft M, detected by the sensors, and the reference trajectory of the vehicle.

15 Claims, 13 Drawing Sheets

OMNIDIRECTIONAL VEHICLE AND METHOD OF CONTROLLING THE SAME

BACKGROUND OF THE INVENTION

1. Field of the Invention

The present invention relates to an omnidirectional vehicle, moveable to the desired direction without changing the orientation of the body thereof and rotatable at the position at that the vehicle stays.

2. Description of the Related Art

Omnidirectional vehicles are disclosed in the Japanese Patent Unexamined Publication No. Hei 2-249769 and No. Hei 2-158460. Japanese Patent Unexamined Publication No. Hei 2-249769 discloses an omnidirectional vehicle that arranges, on the circumference of each wheel, a plurality of free rollers driven to turn in the perpendicular direction to the turning direction of the wheel. Japanese Patent Unexamined Publication No. Hei 2-158460 discloses an omnidirectional vehicle that arranges, on the circumference of each wheel, a plurality of barrel-shaped free rollers driven to turn at an angle of 45 degrees to the turning direction of the wheel.

These conventional omnidirectional vehicles are too large or too heavy to secure a sufficient ground contact area because of their complicated mechanisms. Therefore, these omnidirectional vehicles can hardly be used for carrying a heavy load. And, since pneumatic tires are hardly used due to their mechanical structures, the vibration etc. generated around the ground contact area of the running vehicle propagates to the body of the vehicle.

Since all the wheels which sustain the conventional omnidirectional vehicle are steerable, the vehicle becomes unstable during high-speed driving.

When the conventional omnidirectional vehicle is driven from a remote controller operated by a driver sitting on the vehicle, the orientation of the remote controller changes as the orientation of the vehicle changes. When the conventional omnidirectional vehicle is remote-controlled from outside, the orientation of the running vehicle, that changes as the vehicle runs, and the fixed orientation of the remote controller deviate from one another. Moreover, if the driver moves during driving while holding the remote controller, the driver will have to drive the vehicle in light of the movements the driver has made up to that point. Otherwise, the vehicle will deviate from the target direction.

SUMMARY OF THE INVENTION

In view of the foregoing, it is an object of the invention to provide an omnidirectional vehicle that is small in volume and light in weight, but still strong enough to carry a heavy load, and that facilitates using the pneumatic tire.

It is another object of the invention to provide a method of controlling the omnidirectional vehicle that facilitates driving the vehicle stably at high-speed, and facilitates steering the vehicle safely and stably with the same operational feeling any time when a driver drives the vehicle from a remote controller while sitting on the vehicle or while being positioned outside of the vehicle as the driver wants.

According to an aspect of the present invention, there is provided an omnidirectional vehicle comprising: a body; a driving wheel serving as a steering wheel, the driving wheel being mounted on a wheel shaft; a first actuator for turning the driving wheel; a steering shaft mounted on the wheel shaft; a shaft stub formed on the body of the vehicle, the shaft stub rotatably supporting the steering shaft vertically at the position displaced horizontally from the contact point between the driving wheel and the ground; and a second actuator for rotating the steering shaft.

As the first and second actuators rotate simultaneously, the driving wheel and the steering shaft are driven to move the vehicle in the omnidirection.

The driving unit for the omnidirectional vehicle further comprises: a controller for driving the first and second actuators at a ratio of the angular turning velocity of the driving wheel and the angular rotational velocity of the steering shaft, the ratio being set at a value based on the orientation of each driving wheel.

By this structure, the driving unit for omnidirectional vehicle of the invention is moved to the direction determined by the ratio of the turning angular velocity of the driving wheel and the rotation angular velocity of the steering shaft.

The omnidirectional vehicle is provided with at least one more driving unit that includes the driving wheel, steering shaft, the shaft stub, the actuators and the controller.

By combining the traveling of a plurality of driving units, the body of the vehicle executes translational and rotational movements.

The omnidirectional vehicle further comprises: a first sensor for detecting the position of the body; a second sensor for detecting the orientation of the body; third sensors for detecting the steering angles of the steering shafts; and operating means for calculating the ratio of the angular velocity of each driving wheel and the angular velocity of each steering shaft based on the detected position and orientation of the body, the detected steering angles of the steering shafts, and the reference trajectory of the vehicle.

The position and orientation of the body, and the steering angles of the steering shafts are detected by the sensors. And, the vehicle facilitates moving on the reference trajectory by calculating the angular velocity ratio of each driving wheel and the steering shaft thereof based on the detected values and the reference trajectory of the vehicle.

According to another aspect of the invention, the omnidirectional vehicle is provided with a plurality of driven wheels, the steering shafts thereof being rotatably supported to the body, and means for locking the steering shafts.

By locking the steering shafts of the driven wheels, the omnidirectional vehicle of the invention facilitates turning the driving wheel thereof stably at high-speed, even though the sidewise translational and rotational movements of the vehicle are restricted.

The omnidirectional vehicle further comprises: a remote controller for sending a first command indicative of forward or backward motion, a second command indicative of sidewise motion, and a third command indicative of rotation to the vehicle; and a receiver mounted on the vehicle for receiving the commands sent from the remote controller.

By the provision of the transmitter and the receiver, the driver can drive the omnidirectional vehicle of the invention irrespective of whether the driver is in the vehicle or on the ground.

The omnidirectional vehicle further comprises: a switching switch for changing over between the operation of the remote controller on the vehicle and the operation of the remote controller on the ground.

By the provision of the changeover switch, the driver can drive the vehicle with the same operational feeling irrespective of whether the driver is in the vehicle or on the ground.

It is preferable to provide the remote controller with a fourth sensor for detecting the horizontal orientation of the remote controller, and a correcting means for correcting the input commands based on the detected orientation of the remote controller.

By the provision of the fourth sensor and the correcting means, it is easier to drive the omnidirectional vehicle of the invention based on the orientation of the remote controller, even when the orientation of the remote controller changes with the movement of the driver.

One method of controlling the omnidirectional vehicle of the invention comprises the steps of: orienting the driven wheels in parallel with the moving direction of the vehicle; locking the steering shaft of the driven wheels; steering the driving wheels so as to control the moving direction of the vehicle; and controlling the turning velocity of the driving wheels so as to control the moving velocity of the vehicle.

By this method, the omnidirectional vehicle of the invention runs stably even at high-speed.

Another method of controlling the omnidirectional vehicle of the invention further comprises: a high-speed driving mode that includes the steps of orienting the driven wheels in parallel to the moving direction of the vehicle, locking the steering shaft of the driven wheels, steering the driving wheels so as to control the moving direction of the vehicle; and controlling the turning velocity of the driving wheels so as to control the moving velocity of the vehicle; and an omnidirectional traveling mode that includes the step of unlocking the driven wheels so as to change over between the high-speed driving mode and the omnidirectional traveling mode.

The omnidirectional vehicle can be driven under an appropriate mode suitable for the drive conditions of the vehicle.

The omnidirectional traveling mode is changed switched to the high-speed driving mode after the steering angles of the driving wheels and the driven wheels have been brought within a predetermined angle range with respect to the body of the vehicle during the forward movement of the vehicle under the omnidirectional traveling mode.

By this preparation, the omnidirectional vehicle of the invention is securely switched to running under the high-speed driving mode.

According to still another aspect of the invention, the omnidirectional vehicle comprises: a driving unit including a chassis; a pair of driving wheels serving as steering wheels, the wheel shafts thereof being aligned and being axially supported by the chassis; a pair of actuators for turning the driving wheels; a steering shaft mounted on the wheel shafts through the chassis; and a shaft stub formed on the body of the vehicle, the shaft stub rotatably supporting the steering shaft vertically at the position displaced horizontally from the midpoint between the ground contact points of the driving wheels.

As the actuators rotate, the driving wheels turn to move the vehicle.

The omnidirectional vehicle is provided with a controller for turning the driving wheels through the actuator so to redirect the driving unit, for turning the driving wheels at different turning velocities to rotate the chassis, and to steer the driving unit.

By this measure, the driving wheels are turned by the actuators to redirect the driving unit, and the driving unit is rotated in response to the turning difference of the driving wheels.

The omnidirectional vehicle is further provided with at least one more driving unit that includes a chassis; a pair of driving wheels serving as steering wheels, the wheel shafts thereof being aligned and being axially supported by the chassis; a pair of actuators for turning the driving wheels; a steering shaft mounted the wheel shafts through the chassis; and a shaft stub formed on the body of the vehicle, the shaft stub rotatably supporting the steering shaft vertically at a position displaced horizontally from the midpoint between the ground contact points of the driving wheels.

By combining the movements of a plurality of driving units, the body of the omnidirectional vehicle of the invention executes translational and rotational movements.

It is preferable to provide the omnidirectional vehicle with a position sensor for detecting the position of the body; an orientation sensor for detecting the orientation of the body; angle sensors for detecting the steering angles of each driving unit; and an operating means for calculating the angular velocity ratio of the driving wheels for each driving unit based on the detected position and orientation of the body, the detected steering angles of each driving unit, and the reference trajectory of the vehicle.

According to still another aspect of the invention, the omnidirectional vehicle comprises: a driving unit that includes a chassis; a pair of driving wheels serving as steering wheels, wheel shafts thereof aligned and axially supported by the chassis; first and second actuators for turning the driving wheels; a steering shaft on that the wheel shafts are mounted through the chassis; a shaft stub formed on the body of the vehicle, the shaft stub rotatably supporting the steering shaft vertically at a position displaced horizontally from the midpoint between the ground contact points of the driving wheels; and a third actuator for rotating the steering shaft.

As the actuators rotate simultaneously, the driving wheels and steering shaft are driven to move the vehicle in the omnidirection.

The omnidirectional vehicle further comprises: a controller for driving the first and second actuators at a ratio of the turning velocities of the driving wheels, the ratio being set at a value based on the orientation of the driving unit, and for driving the third actuator so as to orient the body of the vehicle to a reference orientation.

By this structure, the omnidirectional vehicle of the invention is moved in a direction determined by the ratio of the angular turning velocities of the driving wheels and is oriented to a predetermined orientation.

The omnidirectional vehicle is provided with at least one or more driving units, each unit thereof including a chassis; a pair of driving wheels serving as steering wheels, wheel shafts thereof aligned and axially supported by the chassis; a first and second actuators for turning the driving wheels; a steering shaft on that the wheel shafts are mounted through the chassis; and a shaft stub formed on the body of the vehicle, the shaft stub rotatably supporting the steering shaft vertically at a position displaced horizontally from the midpoint between the ground contact points of the driving wheels, and a third actuator for rotating the steering shaft.

By combining the movements of the plurality of driving units, the body of the omnidirectional vehicle of the invention executes translational and rotational movements.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENTS

Now the present invention will be explained hereinafter with reference to the accompanied drawings which illustrate the preferred embodiments of the invention.

Figure 1:
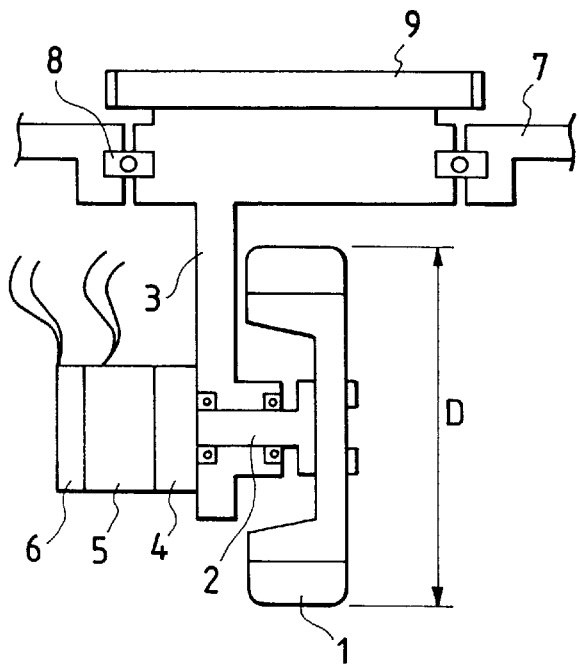
FIG. 1 is a cross section of a first embodiment of a driving unit according to the present invention.
Figure 2:
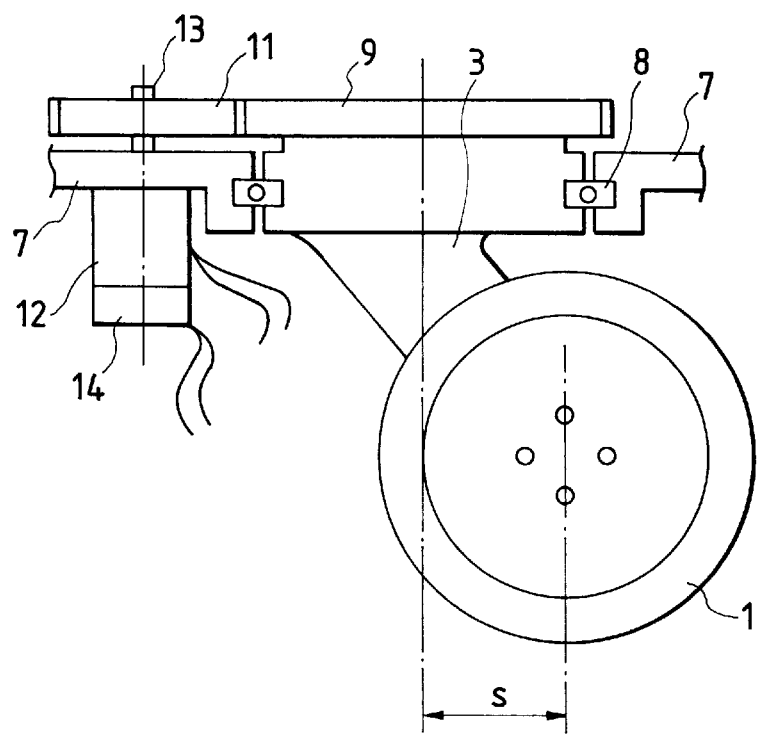
FIG. 2 is a side plan view of the first embodiment of FIG. 1.

FIG. 1 is a cross section of a first embodiment of a driving unit for an omnidirectional vehicle according to the present invention. And, FIG. 2 is a side plan view of the first embodiment of FIG. 1. A driving wheel 1 that also serves as a steering wheel is rotatably supported, by and mounted onto a wheel shaft 2 and, by a suspension 3 that serves as a steering shaft. Usually, a pneumatic tire is mounted on the driving wheel 1. The wheel shaft 2 is coupled to a shaft of the motor 5 that serves as an actuator through a reduction gear 4. An encoder 6 coupled to an end of the motor 5 detects the turning angle of the driving wheel 1.

The upper end of the suspension 3 is supported rotatably around the vertical axis through a shaft bush or shaft stub 8 to the body 7 of the vehicle. The center of the shaft bush 8, i.e. the rotation axis of the suspension 3, is displaced by a horizontal distance S from the contact point between the driving wheel 1 and the ground. A gear 9 is installed coaxially on the upper face of the suspension 3 and coupled with a gear 11 supported by the body 7. The gear 11 is coupled to an output shaft 13 of a motor 12 that serves as an actuator. An encoder or angle sensor 14 coupled to the other end of the motor 12 detects the rotation angle of the suspension 3, i.e. the steering angle.

Figure 3:
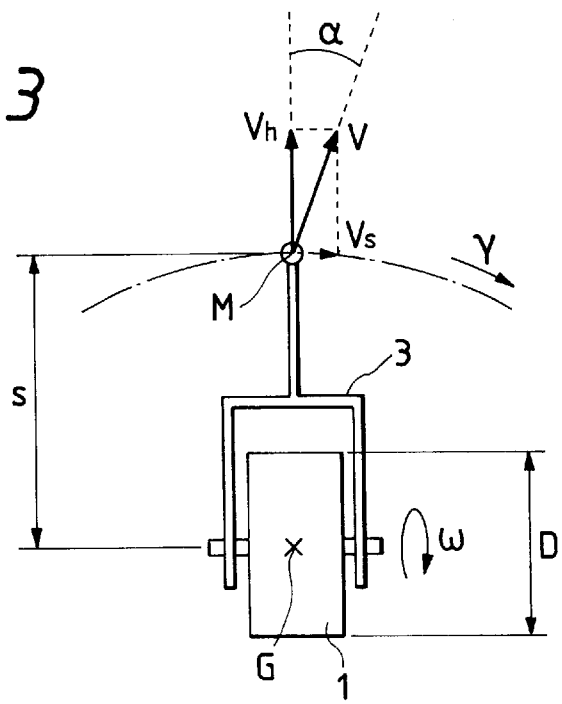
FIG. 3 is a top plan view of the driving unit for explaining the principle of behavior of the driving unit of FIGS. 1 and 2.

FIG. 3 is a top plan view of the driving wheel 1 for explaining the principle of behavior of the driving wheel 1 of FIGS. 1 and 2. For the sake of explanation, the suspension 3 is illustrated as a yoke that supports the driving wheel 1 at both ends thereof. In FIG. 1, the ground contact point of the driving wheel 1 is indicated by G, and the center of rotation of the suspension (steering shaft) 3 by M. The distance between G and M corresponds to the offset distance S. When the driving wheel 1 having an outside diameter D is turned at an angular velocity ω by the motor 5 so that the suspension 3 may travel upward in the figure, the steering shaft M gains a traveling velocity $V_H$ along the forward direction of the driving unit expressed by the following equation.

$$V_H = (D/2)\omega \quad (1)$$

When the suspension 3 is rotated at an angular velocity γ by the motor 12 so that the driving wheel 1 supported on the suspension 3 may rotate clockwise, the driving wheel 1, forced to move sidewise by the suspension 3, is prevented from moving sidewise by the frictional resistance of the ground contact plane, and as the reaction, the suspension 3 rotates clockwise around the point G. In this case, the steering shaft M gains a traveling velocity $V_S$ along the sidewise direction of the driving unit expressed by the following equation.

$$V_S = S_\gamma \quad (2)$$

That is, when the driving wheel 1 and the suspension 3 are rotated simultaneously, the steering shaft M gains two velocity components $V_H$ and $V_S$ which are perpendicular to one another. The velocity components $V_H$ and $V_S$ are synthesized to be a velocity V at that the steering shaft M travels. By representing the angle of the synthesized velocity V by α, each velocity components $V_H$, $V_S$ and the synthesized velocity V are expressed as follows.

$$V_H = V \cos \alpha \quad (3)$$

$$V_S = V \sin \alpha \quad (4)$$

By controlling the angular velocity ω of the driving wheel 1 and the angular velocity γ of the suspension 3 at a certain ratio, it is facilitated to move the steering shaft M to the desired direction. Though the above equations hold at an instance when the suspension 3 starts rotating, the above equations do not hold any more at the next instance when the orientation of the driving wheel 1 changes. However, by detecting the changing orientation of the suspension 3, and by correcting the angular velocities ω and γ in response to the detected orientation the steering shaft M may be kept traveling to the predetermined directions.

Figure 4:
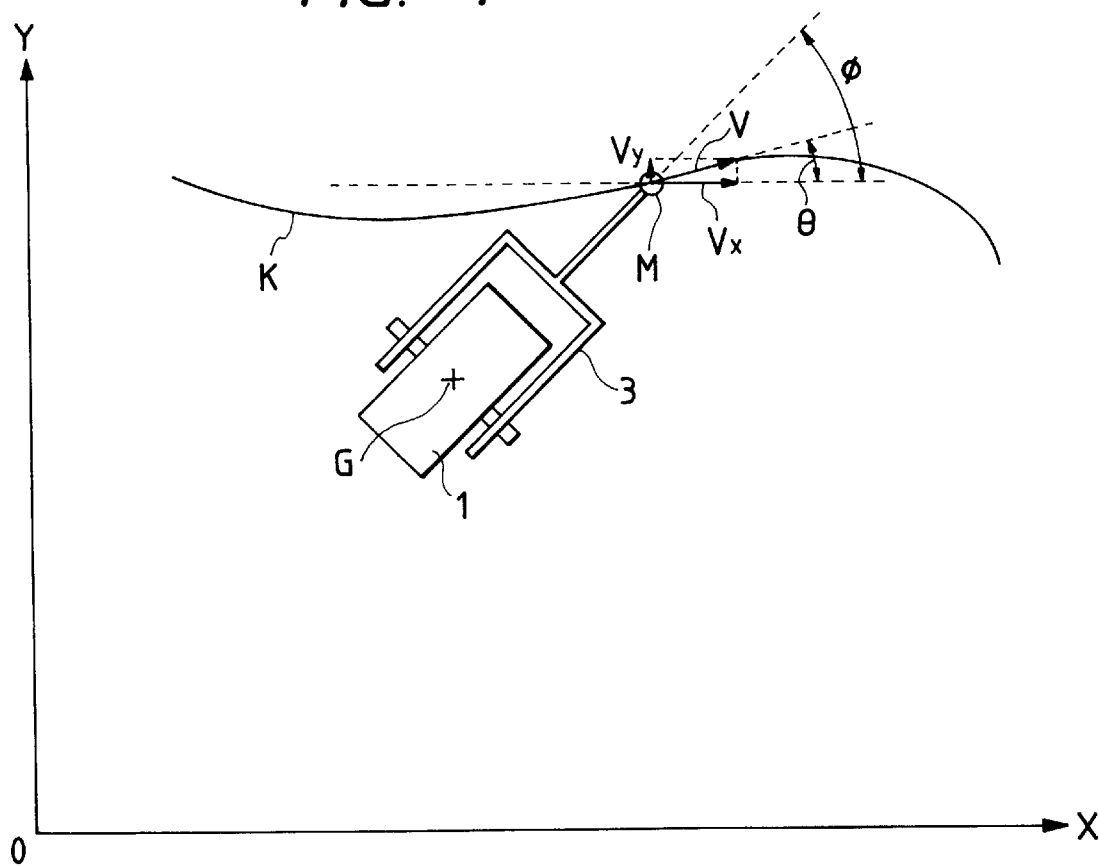
FIG. 4 is a top plan view of the driving unit for explaining the control method for moving the steering shaft of FIG. 3 on a predetermined trajectory.

FIG. 4 is a top plan view of the driving wheel 1 for explaining the control method for moving the steering shaft M of FIG. 3 on a predetermined trajectory K. By representing the angle between the X-axis of coordinates and the tangential line at the point on the trajectory K at that the steering shaft M is located by θ, and the angle between the X-axis of coordinates and the driving wheel 1 by φ, each velocity components $V_H$ and $V_S$ which generate the reference velocity V at the steering shaft M are obtained by the following equations.

$$V_H = V \cos(\phi - \theta) \quad (5)$$

$$V_S = V \sin(\phi - \theta) \quad (6)$$

By setting in advance the traveling velocity V, and by detecting all the time during the traveling the angle φ and the angle θ, the velocity components $V_H$ and $V_S$ are obtained. The steering shaft M is facilitated traveling on the reference trajectory K by controlling the angular velocity ω of the driving wheel 1 and the angular velocity γ of the suspension 3 so that the velocity components $V_H$ and $V_S$ may be obtained.

When the velocity components $V_X$ and $V_Y$ with respect to the X- and Y-axes are fed in time sequence as the coordinate data on the reference trajectory K, the velocity components $V_H$ and $V_S$ for each axes of the driving unit are obtained by the following equations with these $V_X$ and $V_Y$.

$$\begin{aligned} V_H &= V \cos(\phi - \theta) \\ &= V \cos\theta \cos\phi + V \sin\theta \sin\phi \\ &= V_X \cos\phi + V_Y \sin\phi \end{aligned} \quad (7)$$

$$\begin{aligned} V_S &= V \sin(\phi - \theta) \\ &= V \cos\theta \cos\phi + V \sin\theta \cos\phi \\ &= V_X \sin\phi + V_Y \cos\phi \end{aligned} \quad (8)$$

Figure 5:
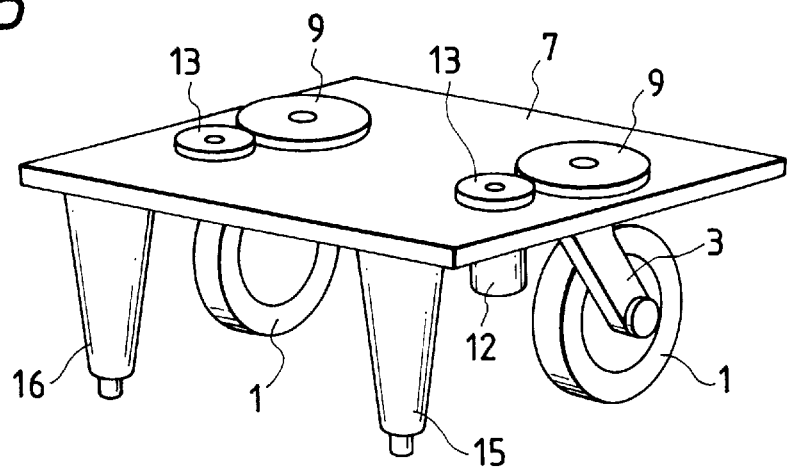
FIG. 5 is an isometric view showing the entire omnidirectional vehicle of the first embodiment.

FIG. 5 is an isometric view showing an entire vehicle of the first embodiment of the invention. In this vehicle (hereinafter sometimes referred to as "the first vehicle"), driving units, each of which includes the driving wheel 1, the suspension 3, the shaft bush 8. the motors 5, 12, a not shown controller, etc., are mounted on both sides of the vehicle. The first vehicle has two driven wheels 15.

Figure 6:
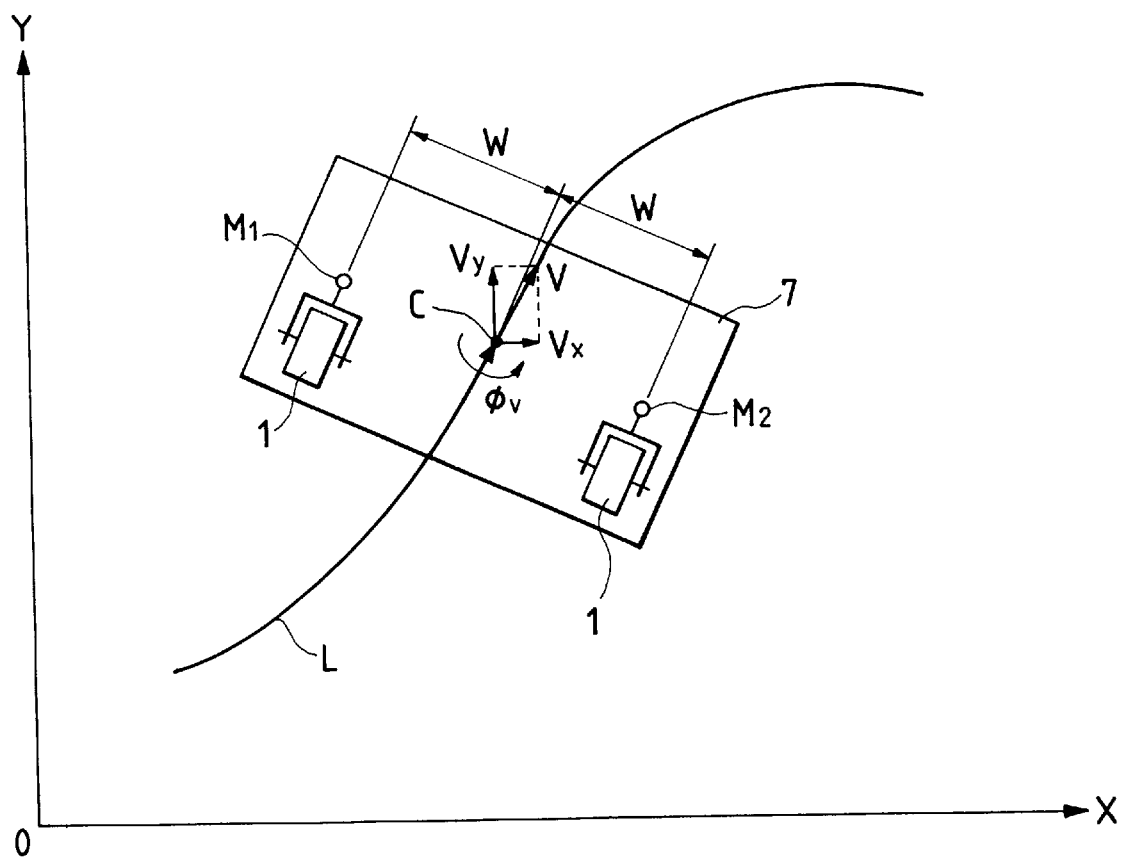
FIG. 6 is a top plan view of the vehicle of FIG. 5 for explaining the control method for moving the vehicle so that the center of the body may travel on a reference trajectory.

FIG. 6 is a top plan view of the omnidirectional vehicle of FIG. 5 for explaining the control method for moving the vehicle so that the center C of the body 7 may travel on a reference trajectory L.

The center C is positioned at the middle point of steering shafts $M_1$ and $M_2$ spaced by a distance 2W. By representing the traveling velocity of the center C by V, and the velocity components with respect to X- and Y-axes by $V_{XC}$ and $V_{YC}$, the velocity components $V_{X1}$ and $V_{Y1}$ of the steering wheel $M_1$ with respect to the X- and Y-axes and the velocity components $V_{X2}$ and $V_{Y2}$ of the steering wheel $M_2$ with respect to the X- and Y-axes are expressed by the following equations when the body 7 executes translational movement without rotating.

$$V_{X1} = V_{XC} \quad (9)$$

$$V_{Y1} = V_{YC} \quad (10)$$

$$V_{X2} = V_{XC} \quad (11)$$

$$V_{Y2} = V_{YC} \quad (12)$$

When the body 7 rotates at an angular velocity $d\phi_V/dt$ without translation, the velocity components $V_{X1}$ and $V_{Y1}$ of the steering wheel $M_1$ and the velocity components $V_{X2}$ and $V_{Y2}$ of the steering wheel $M_2$ are expressed by the following equations.

$$V_{X1} = -W(d\phi_V/dt) \cos \phi_V \quad (13)$$

$$V_{Y1} = -W(d\phi_V/dt) \sin \phi_V \quad (14)$$

$$V_{X2} = -W(d\phi_V/dt) \cos \phi_V \quad (15)$$

$$V_{Y2} = -W(d\phi_V/dt) \sin \phi_V \quad (16)$$

Here, $\phi_V$ is an angle between the X-axis of coordinates and the body 7.

When the body 7 travels at the velocity V while rotating at the angular velocity $d\phi_V/dt$, the velocity components $V_{X1}$ and $V_{Y1}$ of the steering wheel $M_1$ and the velocity components $V_{X2}$ and $V_{Y2}$ of the steering wheel $M_2$ are expressed as follows by adding the equations 9 through 12 and the respective equations 13 through 16.

$$V_{X1} = V_{XC} - W(d\phi_V/dt) \cos \phi_V \quad (17)$$

$$V_{Y1} = V_{YC} - W(d\phi_V/dt) \sin \phi_V \quad (18)$$

$$V_{X2} = V_{XC} + W(d\phi_V/dt) \cos \phi_V \quad (19)$$

$$V_{Y2} = V_{YC} + W(d\phi_V/dt) \sin \phi_V \quad (20)$$

The body 7 is moved on the reference trajectory L by steering and rotating the right and left driving wheels 1 based on the thus obtained velocity components. Since the first vehicle of the invention can be moved forward, backward, to the right, and to the left, and can be rotated, the body 7 facilitates instantaneously turning to travel in all the directions. Therefore, the omnidirectional vehicle of the present invention can be used in various industries as a small vehicle that can easily make sharp turns.

The omnidirectional vehicle can be steered smoothly, since the vehicle is driven to curve by turning the driving wheel 1 and steering the suspension 3 simultaneously.

Since the pneumatic tire can be used as the driving wheel 1, the vibrations etc. generated at the contact point during running are prevented from propagating to the body 7.

Though the movement of the first omnidirectional vehicle has been explained by way of a vehicle having a pair of driving units thereon, the present invention is applicable to the vehicles having three or more driving units.

Figure 7:
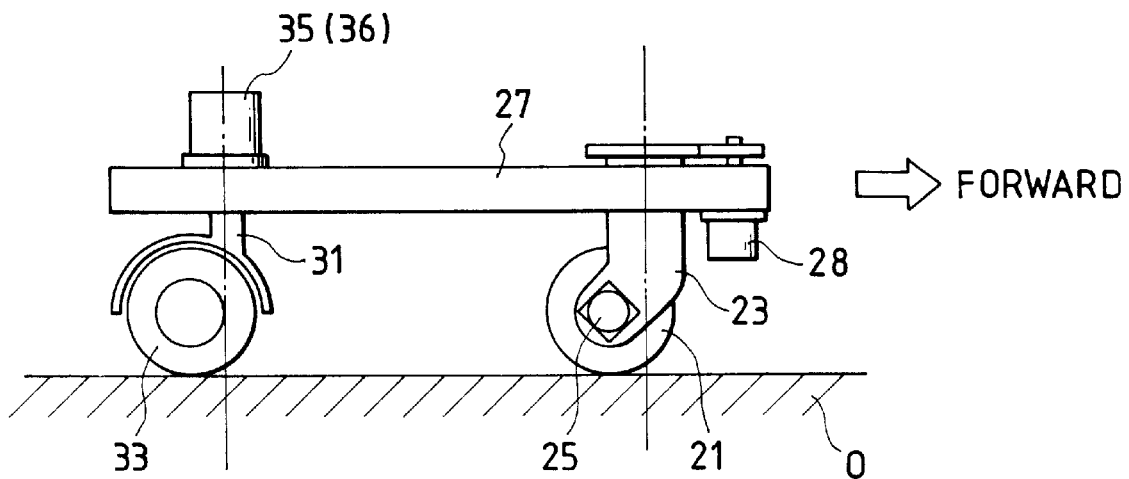
FIG. 7 is a side view of a second embodiment of an omnidirectional vehicle according to the present invention.
Figure 8:
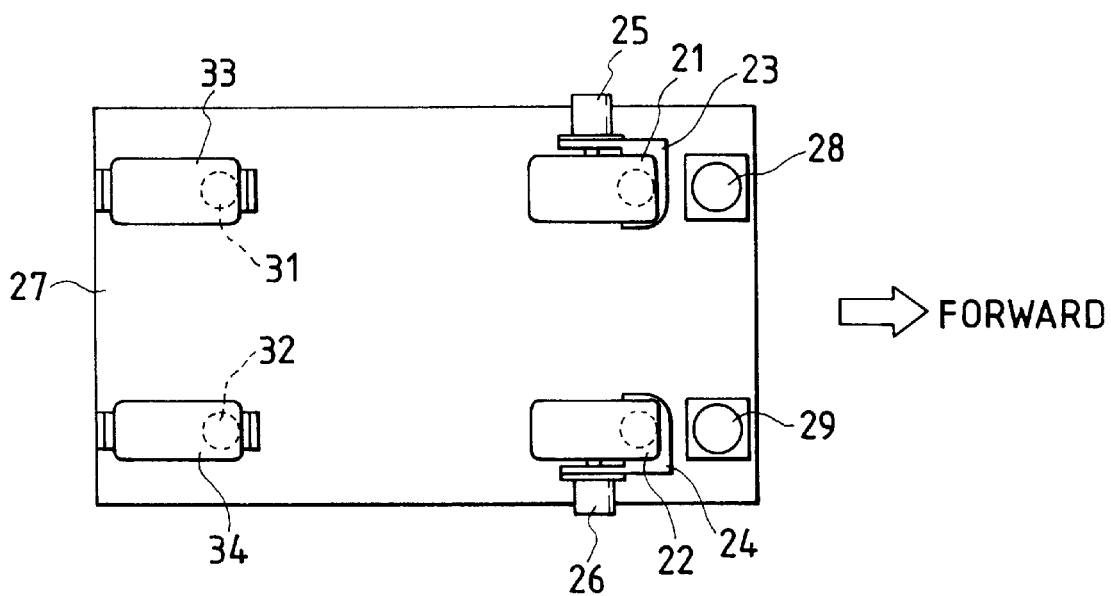
FIG. 8 is a bottom plan view of the vehicle of FIG. 7.

FIG. 7 is a side view of a second embodiment of an omnidirectional vehicle according to the present invention. And, FIG. 8 is a bottom plan view of the vehicle of FIG. 7.

In these figures, driving wheels 21, 22 which serve as steering wheels are axially supported by suspensions 23 and 24 which serve as steering shafts. The wheel shafts of the driving wheels 21, 22 are turned by motors 25, 26. Pneumatic tires are installed on the driving wheels 21, 22. The suspensions 23 and 24 are installed on the front part of a body 27 of the vehicle and freely rotatable around the respective vertical steering axes. The suspensions 23, 24 support the driving wheels 21 and 22 at the points displaced from the respective vertical steering axes.

The upper ends of the suspensions 23, 24 are coupled with respective motors 28, 29 which steer the suspensions 23, 24. The motors 25, 26, 28 and 29 have respective encoders installed thereon. Suspensions 31, 32 are installed on the rear part of a body 27 of the omnidirectional vehicle and freely rotatable around the respective vertical axes. Hereinafter, the reference numeral 27 sometimes designates the vehicle itself. Driven wheels 33, 34, axially supported at the lower ends of the respective suspensions 31, 32 at the points displaced from the centers thereof, serve as casters. Brakes 35, 36, which serve as locking means for locking the suspensions 31, 32, are installed on the upper ends of the suspensions 31, 32 which serve as the steering shafts of the driven wheels 33, 34. If we define the right hand side of the vehicle as the front as indicated by arrows in FIG. 7 and 8, the driving wheels 21, 22 are the front wheels, and the driven wheels 33, 34 are the rear wheels.

Since the second embodiment (hereinafter sometimes referred to as "the second vehicle") has the common structure with that of the first vehicle of FIG. 5 except that the driven wheels 33, 34 are provided with the brakes 35, 36, the second vehicle can be controlled in the same manner as the first vehicle to execute translational and rotational movements when the driven wheels 33, 34 are unlocked. A novel feature of the second embodiment is that the second vehicle facilitates stable high-speed driving by steering and turning the driving wheels 21 and 22 almost in the same manner with one another as in the driving of the conventional cars during that the steering shafts 31, 32 of the driven wheels 33, 34 are locked by the brakes 35, 36.

Thus, the second vehicle is provided with an omnidirectional traveling mode that facilitates traveling and turning, and a high-speed driving mode that facilitates driving like a conventional cars while locking the steering shafts of the driven wheels. Therefore, the second vehicle facilitates switching between these two control modes to one another during running in response to the drive conditions. A vehicle provided with one driven wheel also behaves as the second vehicle provided with two driven wheel does.

Figure 9:
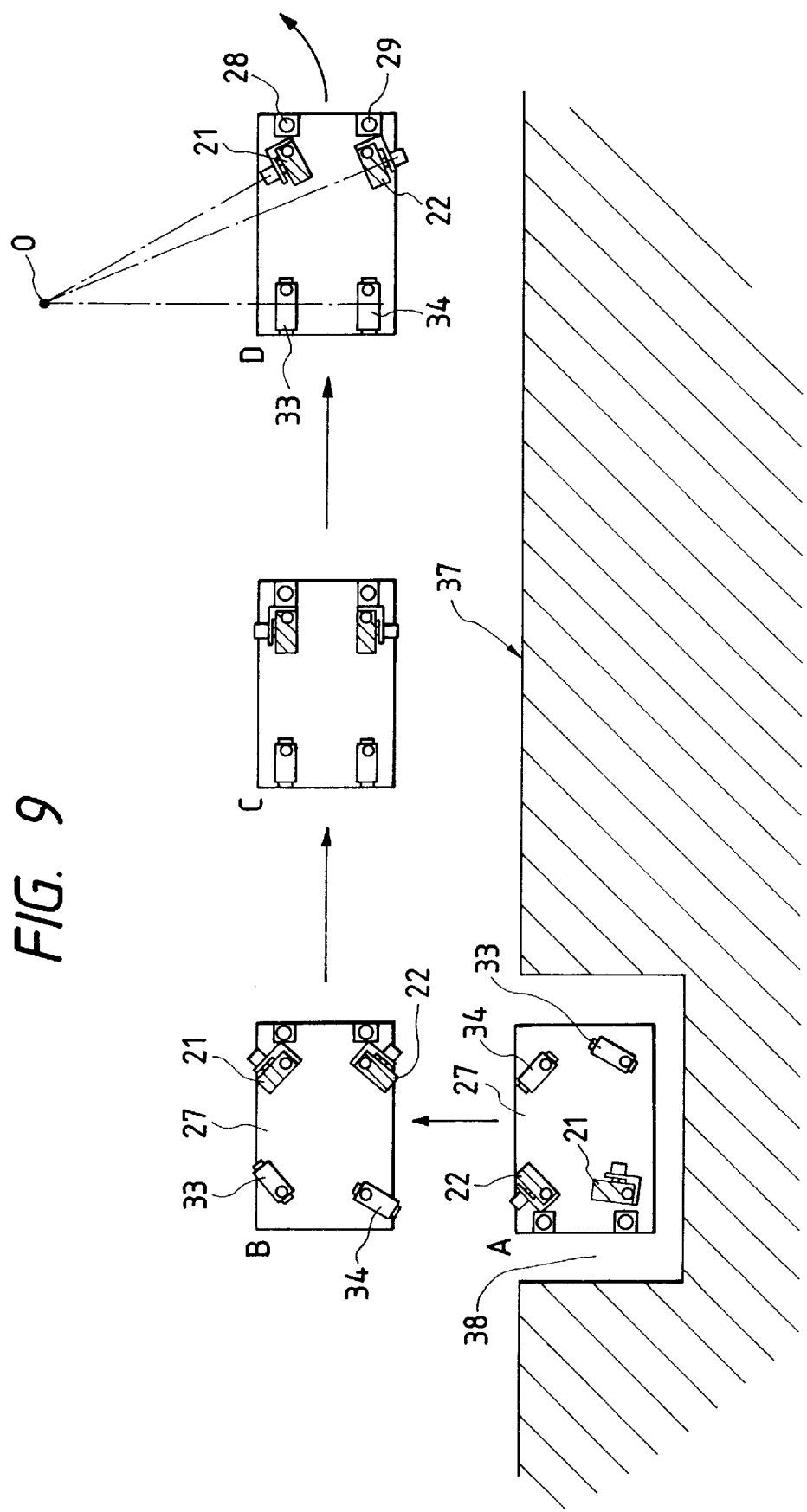
FIG. 9 is a drawing for explaining the switching between the control modes the second embodiment.

FIG. 9 is a drawing for explaining the switching of the above described control modes of the second vehicle. The vehicle 27 is parking initially in a recess 38 formed as a parking lot on a wall 37. The vehicle 27 is translated sidewise from the initial position A to a position B under the omnidirectional traveling mode. Then, the vehicle 27 is turned around at the position B and translated to the right. As a result, the driving wheels 21, 22 are now positioned on the right hand side, and the driven wheels 34, 35 on the left hand side. Immediately after the vehicle 27 has been translated to the point B under the omnidirectional traveling mode, each wheels are pointing at different directions from one another.

Then, as the vehicle 27 advances, all the wheels are gradually oriented in parallel to one another. As soon as a command signal indicating the switching from the omnidirectional traveling mode to the high-speed driving mode is input from a not shown controller by the driver, the steering angles of each wheels are monitored. As soon as the monitored orientations of all the wheels coincide with the advance direction (at a point C), the suspensions 31, 32 working as the steering shafts of the driven wheels 33, 34 are locked by the brakes 35, 36, and the vehicle 27 is switched to the high-speed driving mode. Under the high-speed driving mode, the vehicle 27 is controlled to drive in the similar manner as the general vehicles which drive on the public roads. That is, stable drive at high-speed is facilitated by steering the front wheels while locking the steering shafts of the rear wheels.

Once switched to the high-speed driving mode, it is possible to drive at high speed by increasing the turning speed of the driving wheels 21, 22. For changing the trajectory while driving at high-speed, e.g. for turning left at a point D as shown in FIG. 9, the suspensions 23, 24 as the steering shafts of the driving wheels 21, 22 are rotated counterclockwise. During this cornering motion, each steering angles of the driving wheels 21, 22 are controlled so that the extensions of the axes of the front wheels 21, 22 and the extension of the axes of the rear wheels may always cross at the same point O.

The intersection point O is the rotation center of the vehicle 27. The vehicle 27 is switched from the high-speed driving mode to the omnidirectional traveling mode by releasing the brakes 35, 35 after the vehicle 27 has slowed down within the predetermined speed.

The command signals for drive control of the vehicle 27 are input from an operator having a joy-stick etc. that facilitates inputting each command signals assigned to each of the three degrees of freedom. In the omnidirectional traveling mode, two degrees of freedom are assigned to the backward and forward translation and the sidewise translation respectively, and one degree of freedom is assigned to the rotation. In the high-speed driving mode, one degree of freedom is assigned to the backward and forward translation, and another degree of freedom to the cornering direction.

Figure 10:
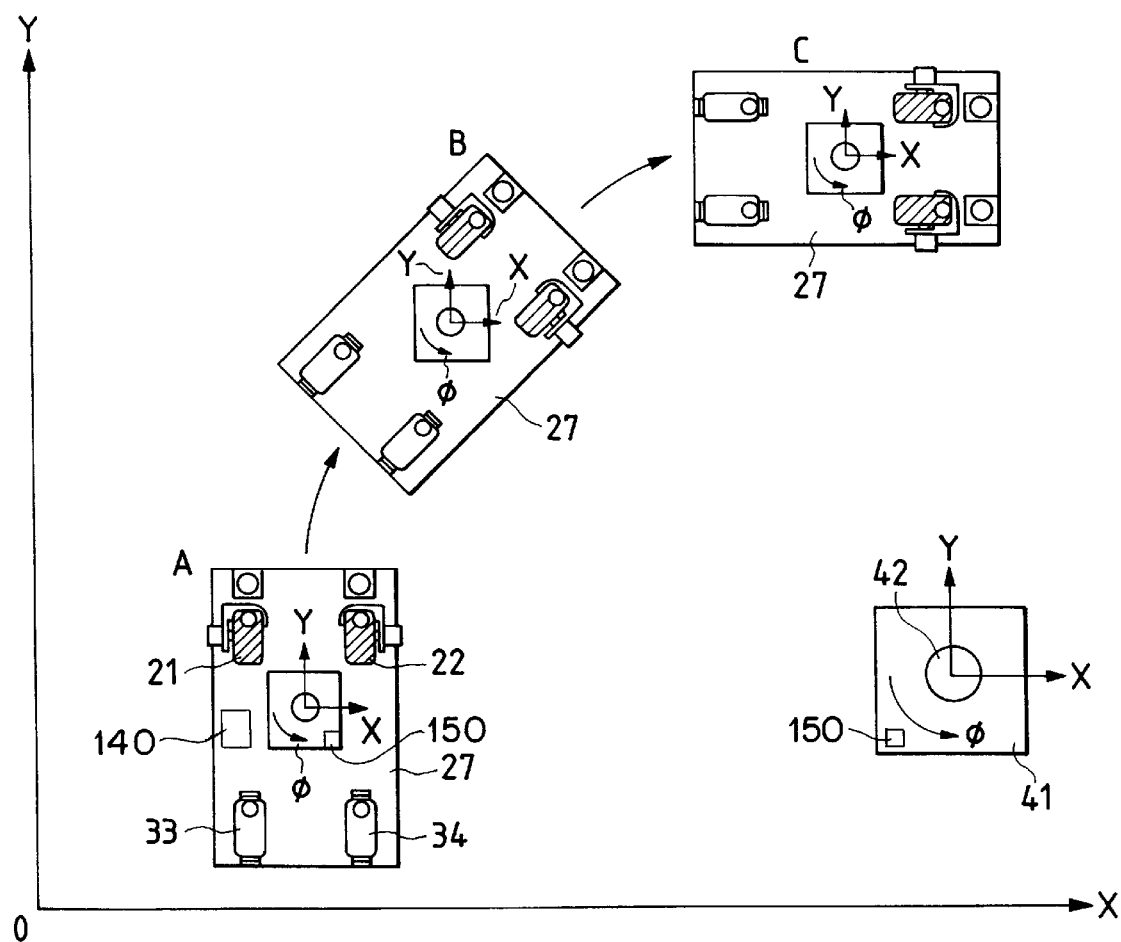
FIG. 10 is a drawing for explaining the maneuvering of the second embodiment from a remote-controller operated by a driver on the ground but not in the vehicle.

FIG. 10 is a drawing for explaining the steering of the second vehicle from a remote-controller 41 operated by a driver staying on the ground but not in the vehicle. In the high-speed driving mode, the vehicle 27 is controlled by operating a control stick 42 of a controller 41 placed on the ground. Command signals are sent from a not shown transmitter of the controller 41 to a receiver 140 mounted on the vehicle 27. And, the driving of the vehicle is controlled based on the command signals. In the illustrated example, the vehicle 27 is turning right to move from a point A to point C through a point B. As the vehicle 27 moves, the orientation of the vehicle 27 rotates clockwise with respect to the X-Y coordinate system fixed on the ground.

That is, the relative angle between the vehicle 27 and the controller 41 changes. Therefore, the relation ship between the advance direction of the vehicle 27 and the direction of the command signals input from the controller 41 to the vehicle 27 at each positions is same as that in the first embodiment. By turning and steering the driving wheels 21, 22 based on the velocity components obtained from the equations 17 through 20, the vehicle 27 is driven in response to the commands of the controller 41. Note that a controller is illustrated on the vehicle 27 only for the sake of explaining the change in the relative angle between the vehicle 27 and the controller 41 fixed on the ground. Actually, the controller 41 is not mounted on the vehicle 27.

Figure 11:
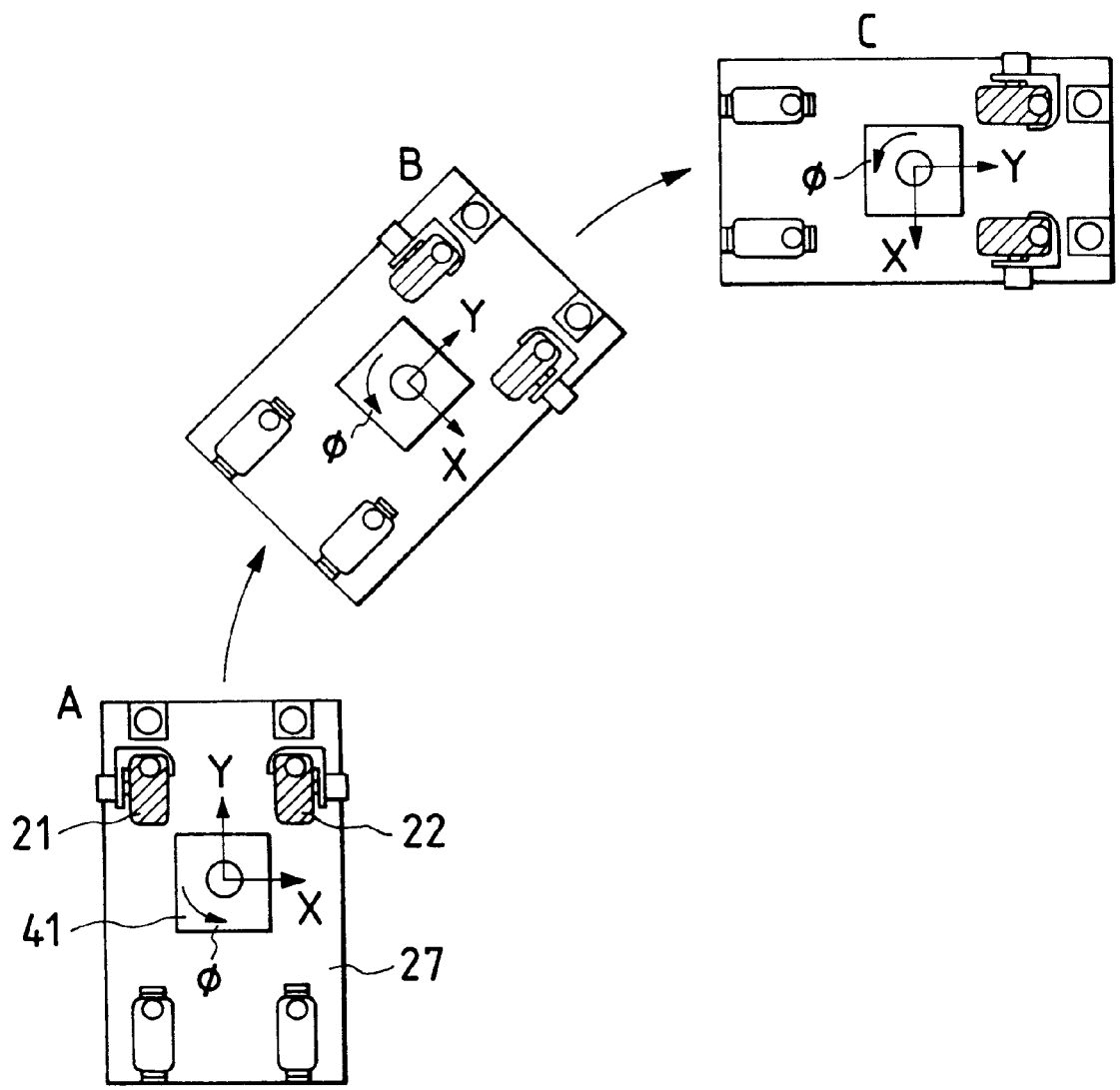
FIG. 11 is a drawing for explaining the maneuvering of the second embodiment from a controller operated by a driver sitting on the vehicle.

FIG. 11 is a drawing for explaining the driving of the second vehicle from the controller operated by a driver sitting on the vehicle. Since the controller 41 rotates with the vehicle 27 as the vehicle turns from a point A to a point C through a point B, the contents of the command signals input at the points B and C from the control stick 42 are different from those in FIG. 10. Therefore, the contents of the command signals and the actual running direction of the vehicle 27 will deviate from each other if any measure is not taken. To avoid this, the variable $\phi V$ in the equations 17 through 20 is substituted by a constant value $\phi V0$ detected as an angle of the vehicle body 27 with respect to the X-axis of coordinates when the control mode on the vehicle is set. As a result, the equations 17 through 20 are now replaced by the following equations 21 through 24.

$$V_{X1} = V_{XC} - W(d\phi_V/dt) \cos \phi_{V0} \quad (21)$$

$$V_{Y1} = V_{YC} - W(d\phi_V/dt) \sin \phi_{V0} \quad (22)$$

$$V_{X2} = V_{XC} + W(d\phi_V/dt) \cos \phi_{V0} \quad (23)$$

$$V_{Y2} = V_{YC} + W(d\phi_V/dt) \sin \phi_{V0} \quad (24)$$

By using the values obtained through these equations as the speed reference values of the driving units with the driving wheel 21, 22, the driver sitting on the vehicle can drive the vehicle with the same feeling with that the driver may feel on the ground. A changeover switch 150 is equipped on the controller 41 or the vehicle 27 for switching between the control from the ground and the control on the vehicle. The driver operates the changeover switch to select the appropriate operation. When the changeover switch is operated to select the control on the vehicle at the start of the control system, the angle $\phi_{V0}$ is set at zero, and the forward direction of the vehicle and the direction of the Y-axis command coincide with one another.

Figure 12:
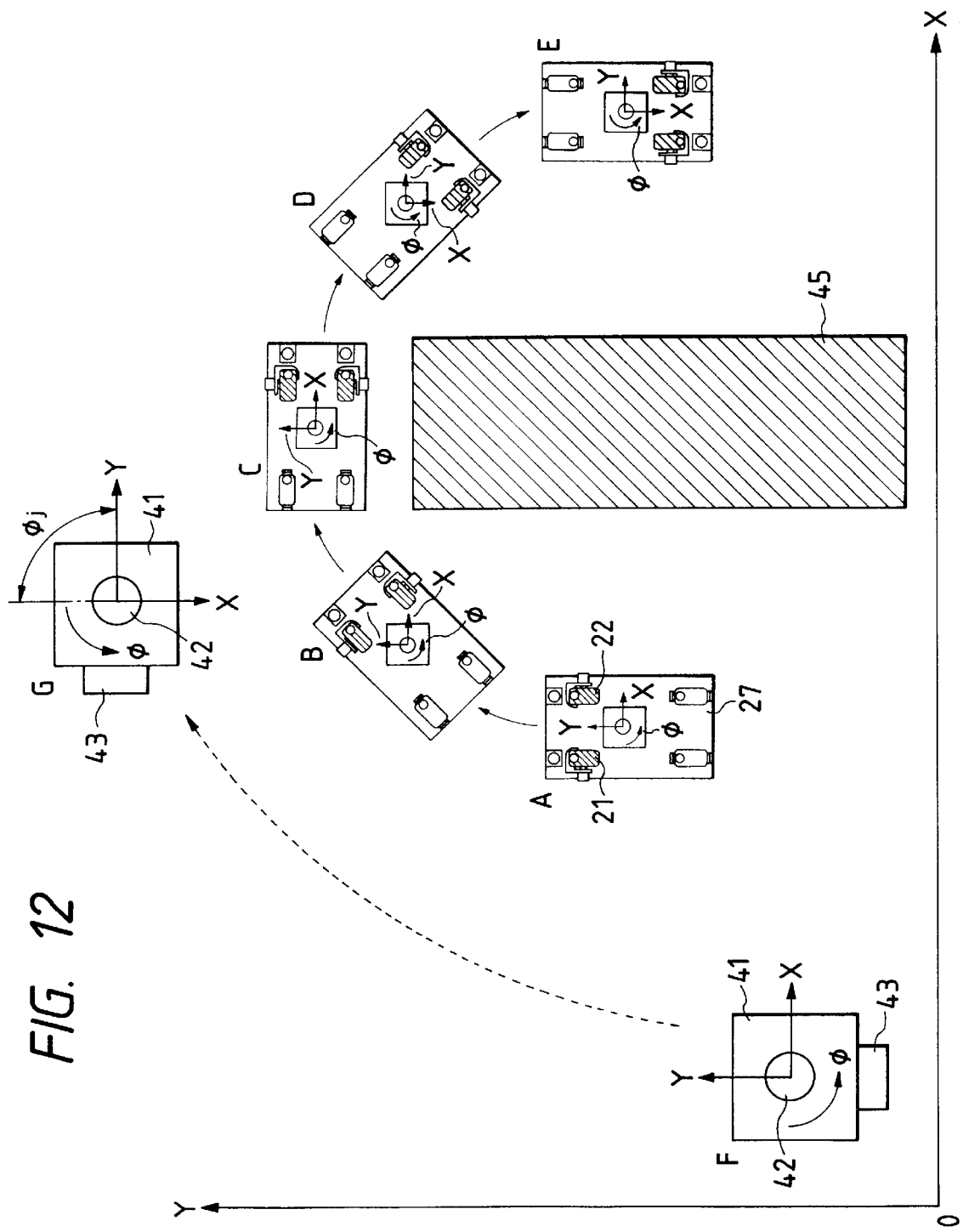
FIG. 12 is a drawing for explaining the maneuvering of the second embodiment from a controller held and operated by a driver on the ground.

FIG. 12 is a drawing for explaining the driving of the second vehicle 27 from a controller held and operated by a driver staying on the ground. When the driver drives the vehicle 27 from the ground through the controller 41 that the driver holds, the orientation of the controller 41 changes as the driver moves on the ground. In FIG. 12, the controller 41 is equipped with an angle sensor 43 that detects the change in the orientation of the controller 41. In this figure, the vehicle 27 turns to move from a point A through points B, C, D to a point E located on the other side of an obstacle 5. The angle sensor 43 is designed so as to detect the relative orientation of the controller 41. The angle sensor 43 may be designed so as to detect the absolute orientation of the controller 41.

The driver starts driving the vehicle 27 through the controller 41 carried with him or her from a point F near to the initial point A. The driver moves to a point G carrying the controller 41 with him or her at a time point midway during the driving before the vehicle 27 will hide behind the obstacle 45. As the vehicle 27 and the driver move, the orientations of the vehicle 27 and the driver change, and the controller 41 is rotated clockwise. A means for correcting the input commands based on the detected orientation of the controller 41 is provided by the angle sensor 43, which detects the rotation angle $\phi_J$ and feeds the detected angle $\phi_J$ to the vehicle 27. The controller of the vehicle 27 corrects $\phi_V$ of the equations 17 through 20 based on the fed angle $\phi_J$ as described in equations 25 through 28.

$$V_{X1}=V_{XC}-W(d\phi_V/dt)\cos(\phi_V-\phi_J) \qquad (25)$$

$$V_{Y1}=V_{YC}-W(d\phi_V/dt)\sin(\phi_V-\phi_J) \qquad (26)$$

$$V_{X2}=V_{XC}+W(d\phi_V/dt)\cos(\phi_V-\phi_J) \qquad (27)$$

$$V_{Y2}=V_{YC}+W(d\phi_V/dt)\sin(\phi_C-\phi_J) \qquad (28)$$

By using the values obtained through these equations as the speed reference values of the driving units with the driving wheel 21, 22, the vehicle 27 is driven along the direction of the command signals input from the control stick 42 of the controller 41, when the orientation thereof is changing as the driver moves.

The controller 41 having therein the angle sensor 43 is applicable also to the control of the robots equipped with the similar drive mechanism with that of the omnidirectional vehicle of the invention.

Figure 13:
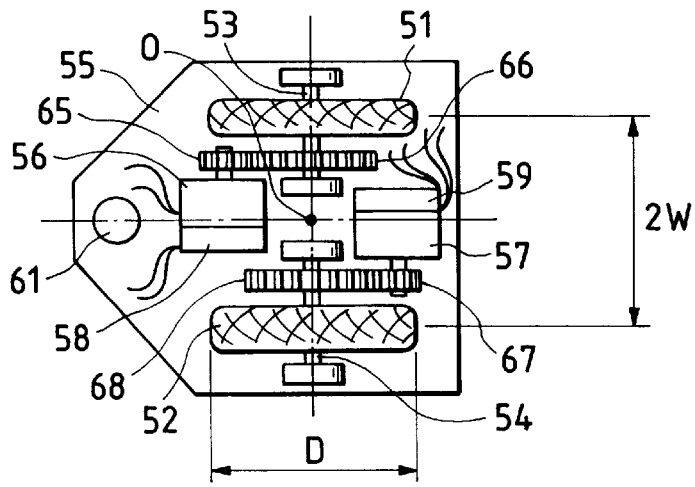
FIG. 13 is a top plan view of a third embodiment of a driving unit according to the present invention.
Figure 14:
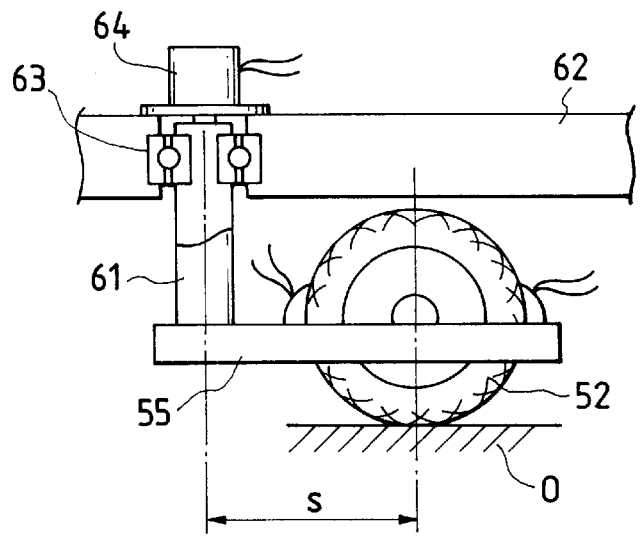
FIG. 14 is a side plan view of the third embodiment in that a part of FIG. 13 is removed.

FIG. 13 is a top plan view of a third embodiment of an omnidirectional vehicle according to the present invention. And, FIG. 14 is a side plan view of the third embodiment in that a part of FIG. 13 is removed for the sake of clear illustration. In these figures, driving wheels 51, 52 have a diameter D, and serve also as steering wheels. Wheel shaft 53, 54 of the driving wheels 51, 52 are axially supported by a chassis 55 at the points at that the wheel shaft 53, 54 may align coaxially. Motors 56, 57 which serve as actuators are mounted on the chassis 55, and connected to the wheel shaft 53 and 54 through gears 65, 66 and 67, 68.

The motors 56 and 57 are equipped with encoders or sensors 58, 59 attached on the other ends thereof. A steering shaft 61 is arranged vertically on the front part of the chassis 55. The upper end of the steering shaft 61 is axially supported by a body 62 of the vehicle of FIG. 13 (hereinafter sometimes referred to as "the third vehicle") through a shaft stub 63. The steering shaft 61 is perpendicularly displaced by a horizontal distance S from the midpoint between the driving wheels 51 and 52. The driving unit of the third vehicle 62 consists of the above described constituent elements. An encoder or an angle sensor 64 is installed on the upper end of the steering shaft 61 to detect the rotational angle of the steering shaft 61, i.e. the steering angle of the driving unit of the third vehicle 62.

Figure 15:
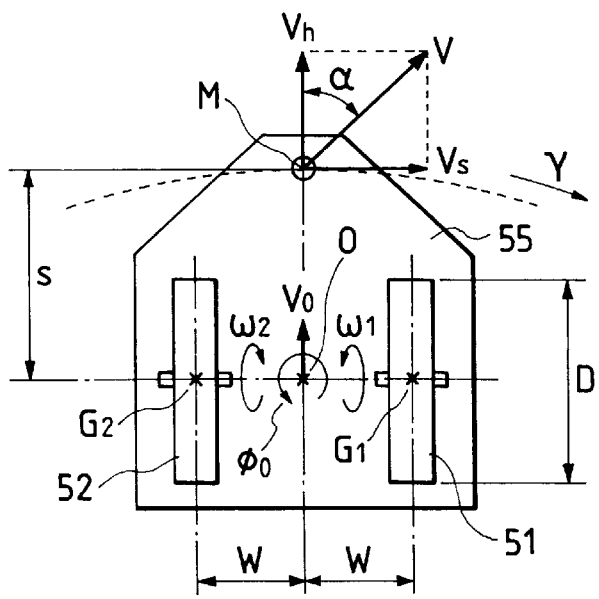
FIG. 15 is a drawing for explaining the maneuvering of the third embodiment of FIGS. 13 and 14.

FIG. 15 is a drawing for explaining the maneuvering of the drive unit of FIGS. 13, 14. In FIG. 15, the symbols $G_1$ and $G_2$ designate the ground contact points of the driving wheels 51, 52. The symbol M designates the rotation center of the steering shaft 61. The rotation center M of the steering shaft 61 and the midpoint 0 of the ground contact points $G_1$ and $G_2$ is displaced by the offset distance S. By turning the driving wheels 51, 52, D in diameter, by the motors 56, 57, the midpoint O is translated and rotated. When the driving wheels 51 and 52 are turned at the angular velocities $\omega_1$ and $\omega_2$, the translational velocity Vo and the angular rotational velocity $d\phi_O/dt$ of the midpoint O are obtained by the following equations of motion well known for the vehicles driven by two independent wheels.

$$V_0=(D\omega_1/2+D\omega_2/2)/2=D(\omega_1+\omega_2)/4 \qquad (29)$$

$$\phi_0=(D\omega_1/2W-D\omega_2/2W)/2=D(\omega_1+\omega_2)/4W \qquad (30)$$

In this instance, the rotation center M of the steering shaft 61 gains a velocity component $V_H$ along the forward direction of the driving unit and a velocity component $V_S$ along the sidewise direction of the driving unit. The velocity $V_H$ and the velocity $V_S$ are obtained by the following equations.

$$V_H=V_0=D(\omega_1+\omega_2)/4 \qquad (31)$$

$$V_S=S\ d\phi_0/dt=DS(\omega_1-\omega_2)/4W \qquad (32)$$

These velocity components $V_H$ and $V_S$ are synthesized at the rotation center M to be a velocity V at that the third vehicle 62 is driven from the chassis 55 through the steering shaft 61 in the direction tilting by an angle $\alpha$ to the Y-axis. The velocity components $V_H$ and $V_S$ are expressed by the following equations.

$$V_H=V\cos\alpha \qquad (33)$$

$$V_S=V\sin\alpha \qquad (34)$$

By controlling the rotation of the motors 56, 57 so that the angular velocity $\omega_1$ of the driving wheel 51 and the angular velocity $\omega_2$ of the driving wheel 52 may keep a certain ratio, it is facilitated to move the steering shaft M to the predetermined direction. Though the above equations hold at an instance when the chassis 55 starts rotating, the above equations do not hold any more at the next instance when the orientation of the chassis 55, i.e. the orientation of the driving wheels 51 and 52, changes. However, by detecting the changing orientation of the chassis 55 by the encoder 64, and by correcting the angular velocities $\omega_1$ and $\omega_2$ by the following equations, the steering shaft M may be kept traveling to the predetermined direction.

$$\omega_1=2WV_S/DS-2V_H/D \qquad (35)$$

$$\omega_2=(\text{negative sign})2WV_S/DS-2V_H/D \qquad (36)$$

Figure 16:
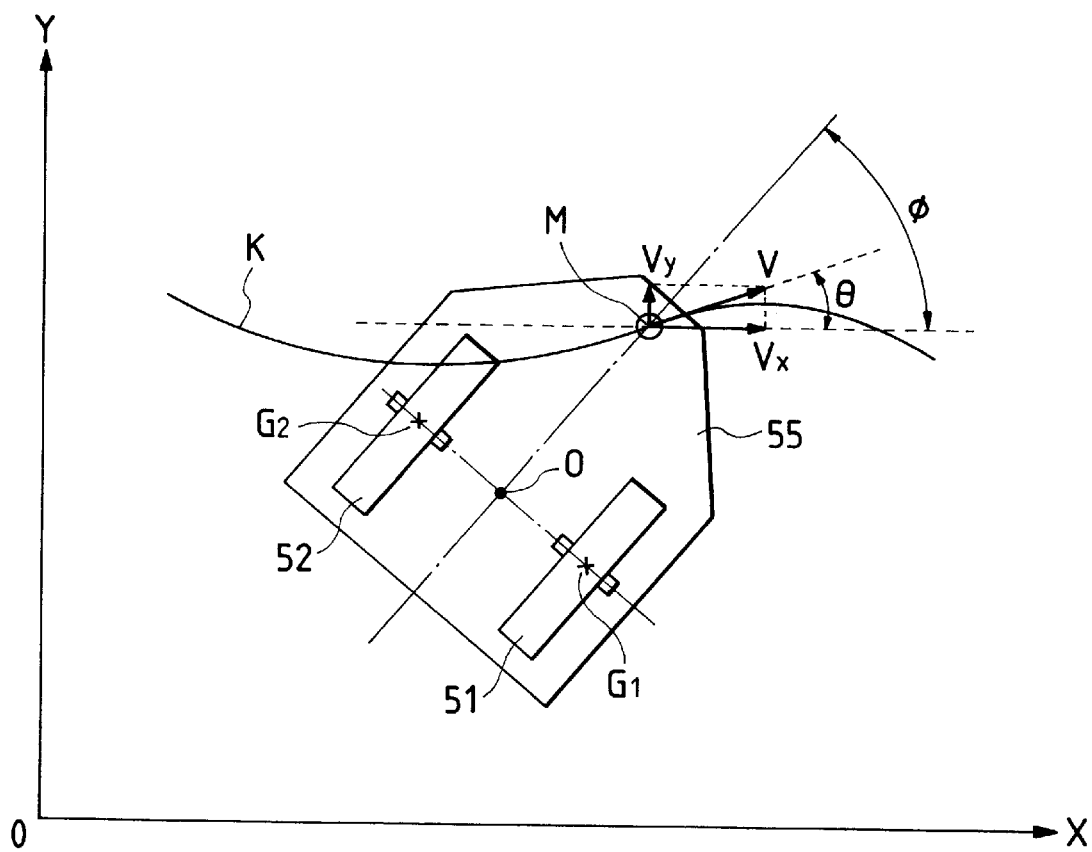
FIG. 16 is a drawing for moving the steering shaft of the third embodiment on a predetermined trajectory.

FIG. 16 is a drawing for explaining the method of moving the steering shaft M of the third vehicle 62 on a predetermined trajectory K. By representing the angle between the X-axis and the tangential line at the point on the trajectory K at that the steering shaft M is located by $\theta$, and the angle between the X-axis and the chassis 55 by $\phi$, each velocity components $V_H$ and $V_S$ for generating the reference velocity V at the steering shaft M are obtained by the following equations.

$$V_H = V \cos(\phi - \theta) \tag{37}$$

$$V_S = V \sin(\phi - \theta) \tag{38}$$

By setting in advance the traveling velocity V, and by detecting all the time during the traveling the angle $\phi$ and the angle $\theta$, the velocity components $V_H$ and $V_S$ are obtained. The steering shaft M is facilitated traveling on the reference trajectory K by controlling the angular velocity $\omega_1$ of the driving wheel 51 and the angular velocity $\omega_2$ of the wheel 52 so that the velocity components $V_H$ and $V_S$ may be obtained. When the velocity components $V_X$ and $V_Y$ with respect to the X- and Y-axes are fed in time sequence as the coordinate data on the reference trajectory K, the velocity components $V_H$ and $V_S$ for each axes of the driving unit may be obtained by the following equations with these $V_X$ and $V_Y$.

$$\begin{aligned} V_H &= V \cos(\phi - \theta) \\ &= V \cos\theta\cos\phi + V \sin\theta \sin\phi \\ &= V_X \cos\phi + V_Y \cdot \sin\phi \end{aligned} \tag{39}$$

$$\begin{aligned} V_S &= V \sin(\phi - \theta) \\ &= V \cos\theta\sin\phi - V \sin\theta\cos\phi \\ &= V_X \sin\phi + V_Y \cos\phi \end{aligned} \tag{40}$$

Figure 17:
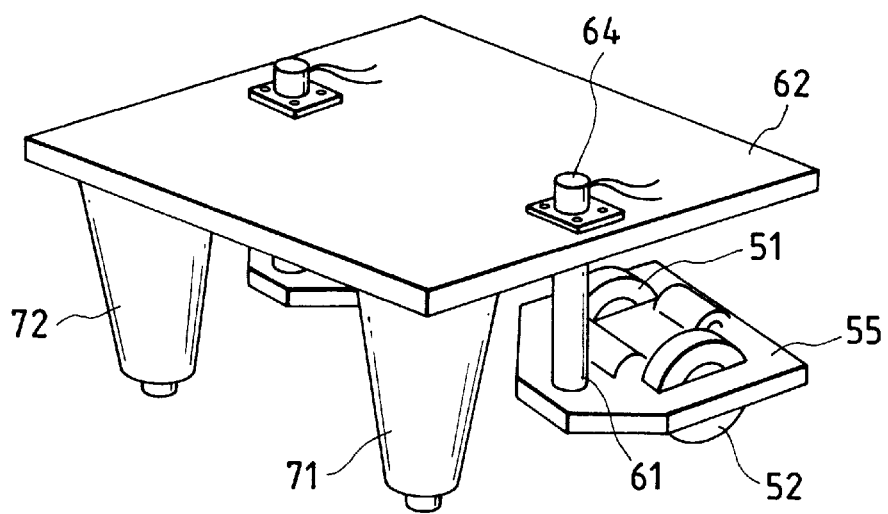
FIG. 17 is an isometric view of a modification of the third embodiment.

FIG. 17 is an isometric view of a modification of the third embodiment. Two driving units shown in FIGS. 13 and 14 are mounted on both sides of the vehicle 62. The vehicle 62 has driven wheels 71, 72. Though the illustrated example is provided with two driving unit, the invention is applicable to the vehicles having three or more driving units.

In the third embodiment too, the driven wheels 71, 72 may be provided with locking means to facilitates switching between the omnidirectional traveling mode and the high-speed driving mode as in the second embodiment.

Figure 18:
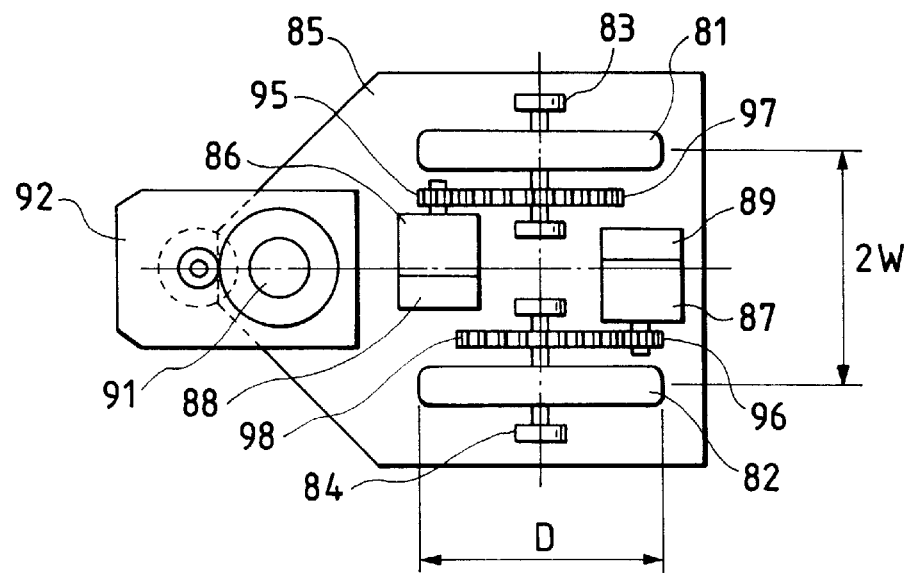
FIG. 18 is a top plan view of a fourth embodiment of a driving unit according to the present invention.
Figure 19:
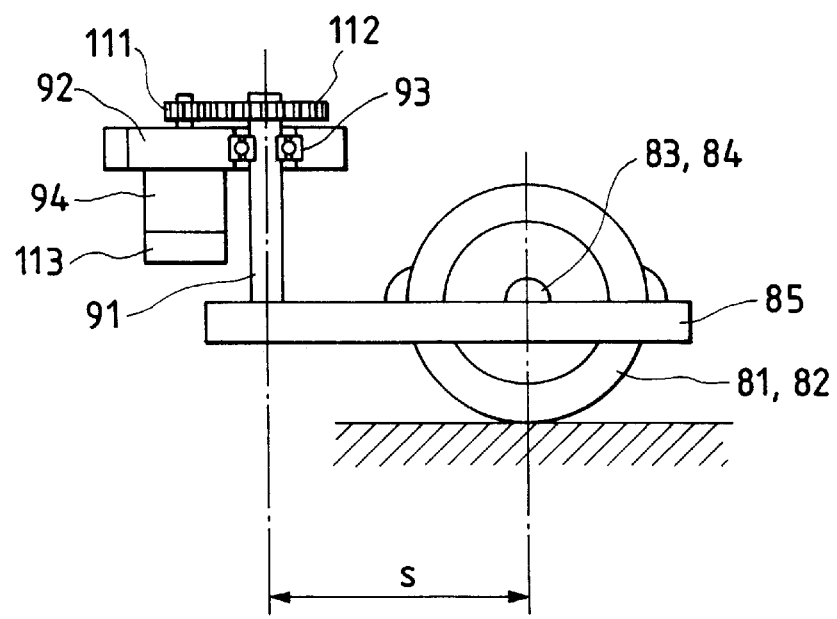
FIG. 19 is a side plan view of the fourth embodiment of FIG. 18.

FIG. 18 is a top plan view of a fourth embodiment of an omnidirectional vehicle according to the present invention. And, FIG. 19 is a side plan view of the fourth embodiment in that a part of FIG. 18 is removed for the sake of clear illustration. In these figures, driving wheels 81, 82 have a diameter D, and serve also as steering wheels. Wheel shafts 83, 84 of the driving wheels 81, 82 are axially supported to the chassis 85 at the point at that the wheel shafts 83, 84 may align coaxially. Motors 86, 87 which serve as actuators are mounted on the chassis 85, and connected to the wheel shafts 53 and 54 through gears 95, 96 and 97, 98.

The motors 86, 87 are equipped with encoders 88, 89 attached on the other ends thereof. A steering shaft 91 is arranged vertically on the front part of the chassis 85. The upper end of the steering shaft 91 is axially supported by a body 92 of the vehicle of FIGS. 18, 19 (hereinafter sometimes referred to as "the fourth vehicle") through a shaft stub 93. The steering shaft 91 is perpendicularly displaced by a horizontal distance S from the midpoint between the driving wheels 81 and 82. A gear 112 is installed coaxially on the upper face of the steering shaft 91 and coupled with a gear 111 supported on the body 92 of the vehicle. The gear 111 is coupled to an output shaft of the motor 94 that serves as an actuator. An encoder 113 coupled to the other end of the motor 94 detects the rotational angle of the steering shaft 91. The driving unit of the fourth vehicle 92 consists of the above described constituent elements.

Figure 20:
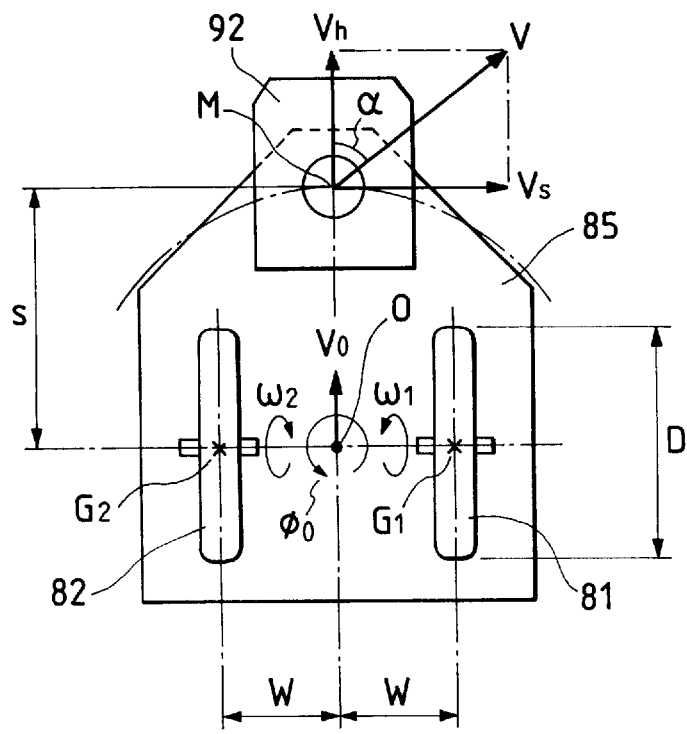
FIG. 20 is a drawing for explaining the moving of the driving unit of FIGS. 18 and 19.

FIG. 20 is a drawing for explaining the moving of the driving unit of FIGS. 18, 19. In FIG. 20, the symbols $G_1$ and $G_2$ designate the ground contact points of the driving wheels 81, 82. The symbol M designates the rotational center of the steering shaft 91. The rotational center M of the steering shaft 91 and the midpoint O of the ground contact points $G_1$ and $G_2$ is displaced by the offset distance S. By turning the driving wheels 81, 82, D in diameter, by the motors 86, 87, the midpoint O is translated and rotated. When the driving wheels 81 and 82 are turned at the angular velocities $\omega_1$ and $\omega_2$, the translational velocity VO and the angular velocity $d\phi_O/dt$ of the midpoint O are obtained by the following equations of motion well known for the vehicle driven by two independent wheels.

$$V_O = (D\omega_1/2 + D\omega_2/2)/2 = D(\omega_1 + \omega_2)/4 \tag{41}$$

$$\phi_O = (D\omega_1/2W - D\omega_2/2W)/2 = D(\omega_1 - \omega_2)/4W \tag{42}$$

In this instance, the rotation center M of the steering shaft 91 gains a velocity component $V_H$ along the forward direction of the driving unit and a velocity component $V_S$ along the sidewise direction of the driving unit. The velocity $V_H$ and the velocity $V_S$ are obtained by the following equations.

$$V_H = V_O = D(\omega_1 \omega_2)/4 \tag{43}$$

$$V_S = S \, d\phi_O/dt = DS(\omega_1 - \omega_2)/4W \tag{44}$$

These velocity components $V_H$ and $V_S$ are synthesized at the rotation center M to be a velocity V at that the fourth vehicle 92 is driven from the chassis 85 through the steering shaft 91 in the direction tilting by an angle $\alpha$ to the Y-axis. The velocity components $V_H$ and $V_S$ are expressed by the following equations.

$$V_H = V \cos \alpha \tag{45}$$

$$V_S = V \sin \alpha \tag{46}$$

Furthermore, when the steering shaft 91 is rotated at the angular velocity $\omega_3$, the angular rotational velocity $d\phi_V/dt$ generated on the body of the vehicle 92 is obtained by the following equation.

$$d\phi_V/dt = \omega_3 - d\phi_O/dt \tag{47}$$

By controlling the rotation of the motors 86, 87 so that the angular velocity $\omega_1$ of the driving wheel 81 and the angular velocity $\omega_2$ of the driving wheel 82 may keep a certain ratio, it is facilitated to move the steering shaft M to the predetermined direction. And, by controlling the rotation of the motor 94 so that the angular velocity $\omega_3$ may compensate the rotational angular velocity $d\phi_O/dt$ of the chassis 85, it is facilitated to rotate the body of the vehicle 92 to the predetermined orientation. Though the above equations hold at an instance when the chassis 85 starts rotating, the above equations do not hold any more at the next instance when the orientation of the chassis 85, i.e. the orientations of the driving wheels 81 and 82, changes. However, by detecting the changing orientation of the chassis 85 by the encoder 113 coupled to the motor 94, and by correcting the angular velocities $\omega_1$ and $\omega_2$ by the following equations, the steering shaft M may be kept traveling to the predetermined direction.

$$\omega_1 = 2WV_S/DS - 2V_H/D \tag{48}$$

$$\omega_2 = -2WV_S/DS - 2V_H/D \quad (49)$$

Figure 21:
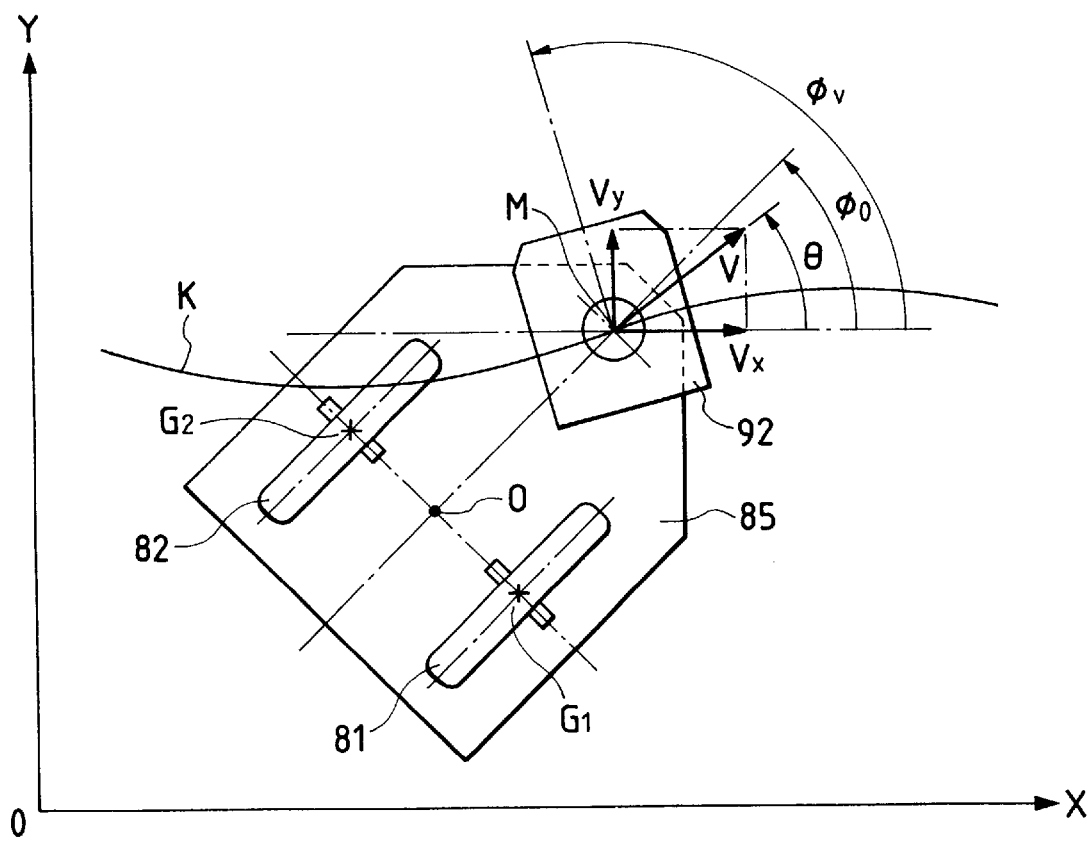
FIG. 21 is a drawing for explaining the method of moving the steering shaft M of the fourth embodiment.

FIG. 21 is a drawing for explaining the method of moving the steering shaft M of the fourth vehicle 92 on a predetermined trajectory K and orienting the body of the vehicle to a reference orientation $\phi_V$. By representing the angle between the X-axis and the tangential line at the point on the trajectory K at that the steering shaft M is located by $\theta$, and the angle between the X-axis and the chassis 85 by $\phi_0$, each velocity components $V_H$ and $V_S$ for generating the reference velocity V at the steering shaft M are obtained by the following equations.

$$V_H = V \cos(\phi - \theta) \quad (50)$$

$$V_S = V \sin(\phi - \theta) \quad (51)$$

$$\omega_3 = d/dt(\phi_{-\phi 0}) \quad (52)$$

By setting in advance the traveling velocity V and the orientation $\phi_V$, and by detecting all the time during the traveling the angle $\phi_0$ and the angle $\theta$, the velocity components $V_H$, $V_S$ and the rotating velocity $\omega_3$ are obtained. The steering shaft M is facilitated traveling on the reference trajectory K by controlling the angular velocity $\omega_1$ of the driving wheel 81 and the angular velocity $\omega_2$ of the wheel 82 so that the velocity components $V_H$ and $V_S$ may be obtained. The body of the vehicle 92 is facilitated rotating to the reference orientation $\phi_V$ by controlling the angular velocity $\omega_3$ of the steering shaft. When the velocity components $V_X$ and $V_Y$ with respect to the X- and Y-axes are fed in time sequence as the coordinate data on the reference trajectory K, the velocity components $V_H$ and $V_S$ for each axes of the driving unit may be obtained by the following equations with these $V_X$ and $V_Y$.

$$\begin{aligned} V_H &= V \cos(\phi - \theta_0) \\ &= V \cos\theta_0 \cos\phi_0 + V \sin\theta \sin\phi \\ &= V_X \cos\phi + V_Y \sin\phi \end{aligned} \quad (53)$$

$$\begin{aligned} V_S &= V \sin(\phi_0 - \theta_0) \\ &= V \cos\theta_0 \sin\phi + V \sin\theta \cos\phi_0 \\ &= V_X \sin\phi_0 + V_Y \cos\phi_0 \end{aligned} \quad (53)$$

Figure 22:
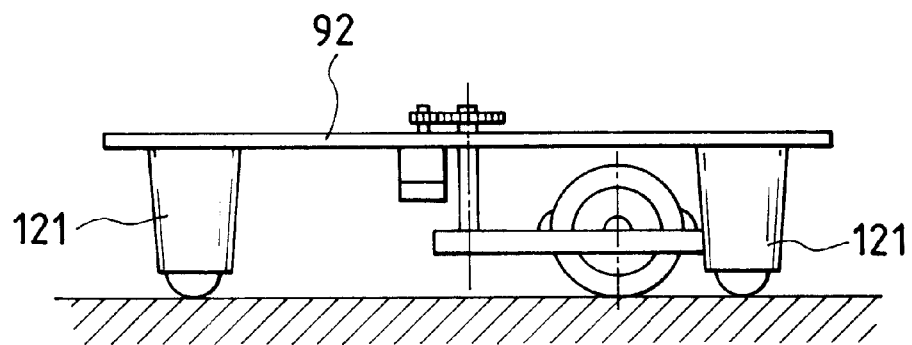
FIG. 22 is a side plan view of a modification of the fourth embodiment.
Figure 23:
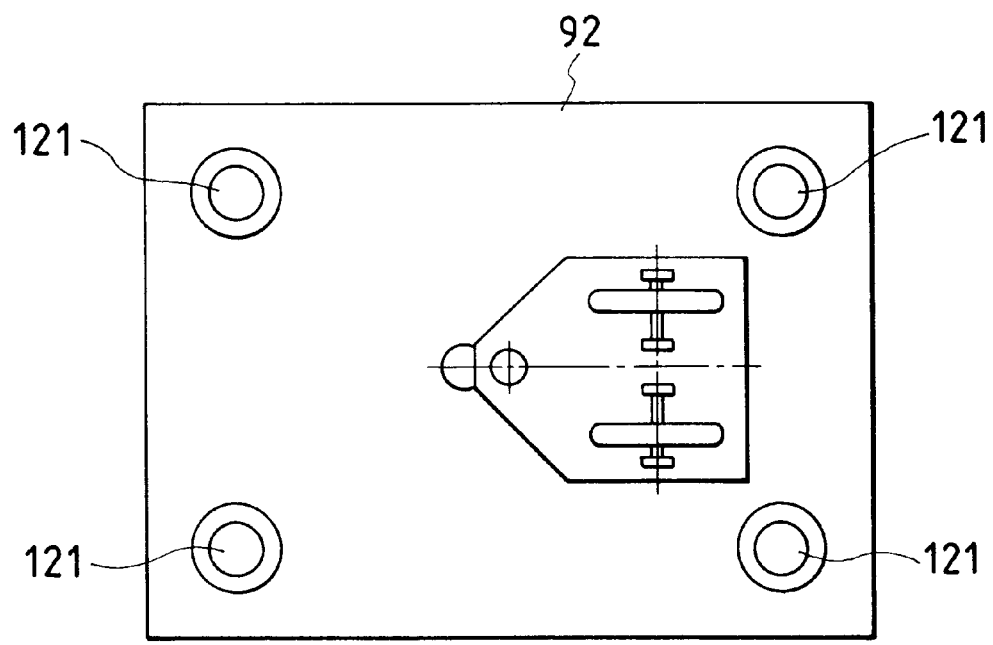
FIG. 23 is a top plan view of the modification of FIG. 22.

FIG. 22 is a side plan view of a modification of the fourth embodiment. And, FIG. 23 is a top plan view of the modification of FIG. 22. One driving unit shown in FIGS. 18 and 19 is mounted on the vehicle 92. The vehicle 92 has four caster wheels 121 at each corners of the body. Though the illustrated example is provided with only one driving unit, the invention is applicable to the vehicles having two or more driving units.

Similarly, in the fourth embodiment, some pairs of caster wheels 121 may be provided with locking means to facilitate switching between the omnidirectional traveling mode and the high-speed driving mode as in the second and thirds embodiments.

As has been explained above, the first omnidirectional vehicle of the invention facilitates backward and forward translational movement as well as sidewise translational movement, and rotational movement with only two simple, small and light drive mechanisms. The drive mechanisms support the steering shafts of the respective driving wheels serving also as the steering wheels to the body of the vehicle through the shaft stubs at the positions horizontally displaced from the ground contact points of the respective driving wheels. The drive mechanisms turn the driving wheels, and rotate the steering shafts. Since the pneumatic tires can be mounted on the wheels, sufficient strength enough to sustain a heavy load is obtained, and vibrations generated in the wheels during running are prevented from propagating to the body of the vehicle.

The second omnidirectional vehicle of the invention facilitates high-speed driving of the vehicle by locking the steering shafts of the driven wheels, and maneuvering the vehicle with the same operational feeling any time when the driver uses the remote-controller in the vehicle or on the ground.

The third omnidirectional vehicle of the invention facilitates backward and forward translational movement, as well as sidewise translational movement and rotational movement, as the first vehicle does, with two or more relatively simple driving units.

The driving unit comprises a chassis, a pair of driving wheels serving as steering wheels, the wheel shafts thereof being aligned and being axially supported to the chassis, a pair of actuators for turning the driving wheels, a steering shaft on that the wheel shaft are mounted through the chassis, and a shaft stub formed on the body of the vehicle, the shaft stub rotatably supporting the steering shaft vertically at the position displaced horizontally from the midpoint between the ground contact points of the driving wheels.

The fourth omnidirectional vehicle of the invention facilitates backward and forward translational movement as well as sidewise translational movement and rotational movement, as the first vehicle does, by at least one driving units, each thereof having only three actuators. The driving unit comprises a chassis, a pair of driving wheels serving as steering wheels, the wheel shafts thereof being aligned and being axially supported to the chassis, a pair of actuators for turning the driving wheels, a steering shaft on that the wheel shaft are mounted through the chassis, and a shaft stub formed on the body of the vehicle, the shaft stub rotatably supporting the steering shaft vertically at the position displaced horizontally from the midpoint between the ground contact points of the driving wheels.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An omnidirectional vehicle, comprising:
   a body;
   a driving unit including:
     a driving wheel having a center and serving as a steering wheel, the driving wheel being mounted on a wheel shaft;
     a first actuator coupled to the wheel shaft, for rotating the driving wheel;
     a steering shaft rotatably supporting the wheel shaft;
     a shaft stub rotatably supported by the body of the vehicle, the shaft stub having a center and holding the steering shaft vertically at a position in which the center of the shaft stub is horizontally displaced from the center of the driving wheel; and a second actuator drivably connected to the steering shaft, for rotating the steering shaft;

a receiver associated with the first and second actuator, for receiving a command; and a controller capable of transmitting the command to control an angular velocity of the driving wheel and an angular velocity of the steering shaft so that a direction of a traveling velocity of the driving unit, obtained by synthesizing a forward traveling velocity in a forward direction and a lateral traveling velocity in a lateral direction, at a steering shaft reference point coincides with a pose direction of the drive unit calculated based on a reference trajectory, the forward traveling velocity being determined by the angular velocity of the driving wheel and the lateral traveling velocity being determined by the angular velocity of the steering shaft.

2. The omnidirectional vehicle of claim 1, further comprising at least one additional driving unit including the driving wheel, the steering shaft, the shaft stub, and the first and second actuators.

3. The omnidirectional vehicle of claim 2, further comprising:

a first sensor coupled to the first actuator, for transmitting a signal to determine a position and an orientation of the body with respect to an initial position and orientation of the body;

the position and the orientation of the body being determinable by the signal of the first sensor and the angular velocity of the driving wheel;

a second sensor coupled to the second actuator, for detecting the steering angle of the steering shafts; and operating means for calculating the ratio of the angular velocity of each driving wheel determined by the first actuator and the angular velocity of each steering shaft determined by the second actuator based on the detected position and orientation of the body, the detected steering angles of the steering shafts, and the reference trajectory of the vehicle.

4. The omnidirectional vehicle of claim 2, further comprising:

a plurality of driven wheels having steering shafts rotatably supported by the body; and means for locking the steering shafts of the plurality of driven wheels.

5. The omnidirectional vehicle of claim 2, wherein the controller is a remote controller for sending a first command indicative of forward or backward motion, a second command indicative of sidewise motion, and a third command indicative of rotation of the vehicle; and the receiver is mounted on the vehicle for receiving the commands sent from the remote controller.

6. The omnidirectional vehicle of claim 5, further comprising:

a changeover switch for changing over between the end operation mode of the remote controller on the vehicle and an operation mode of the remote controller on the ground.

7. The omnidirectional vehicle of claim 5, wherein the remote controller comprises a third sensor for detecting the horizontal orientation of the remote controller relative to the vehicle, and means for correcting the input commands based on the detected orientation of the remote controller.

8. The method of controlling the omnidirectional vehicle of claim 4, the method comprising the steps of:

locking the driven wheels in parallel to the traveling direction of the driving unit;

steering the driving wheels to control the traveling direction of the driving unit; and controlling the traveling velocity of the traveling unit by controlling the angular velocity of the driving wheels and the angular velocity of the steering shaft.

9. The method of controlling the omnidirectional vehicle of claim 4, the method comprising:

locking the driven wheels in parallel to the traveling direction of the driving unit for a high-speed driving mode, steering the driving wheels to control the traveling direction of the driving unit; and controlling the traveling velocity of the driving unit by controlling the angular velocity of the driving wheels; and unlocking the driven wheels for omnidirectional traveling mode thereby switching between the high-speed driving mode and the omnidirectional traveling mode.

10. The method of controlling the omnidirectional vehicle of claim 9, wherein the omnidirectional traveling mode is changed over to the high-speed driving mode after the steering angles of the driving wheels and the driven wheels have been brought within a predetermined angle range with respect to the body of the vehicle during the forward movement of the vehicle under the omnidirectional traveling mode.

11. An omnidirectional vehicle comprising:

a body;

a driving unit including:

a chassis;

a pair of driving wheels each having a center and serving as steering wheels, each of the driving wheels being mounted on wheel shafts, the wheel shafts being aligned and being axially supported to the chassis;

a pair of actuators for rotating the driving wheels;

a steering shaft rotatably supporting the wheel shafts through the chassis; and a shaft stub rotatably supported by the body of the vehicle, the shaft stub having a center and holding a steering shaft vertically at a position in which the center of the shaft stub is horizontally displaced from the center of each of the driving wheels;

a receiver associated with the actuators, for receiving a command; and a controller capable of transmitting the command to control an angular velocity of each of the driving wheels so that a velocity of the driving unit, obtained by synthesizing a forward traveling velocity in the forward direction and a lateral traveling velocity in the lateral direction, at a steering shaft reference point coincides with a pose direction of the drive unit calculated based on a reference trajectory, the forward traveling velocity being determined by the angular velocity of the driving wheels and the lateral traveling velocity being determined by the pair of actuators independently driven to generate a translational velocity and an angular rotational velocity of the chassis.

12. The omnidirectional vehicle of claim 11, further comprising at least one additional driving unit.

13. The omnidirectional vehicle of claim 12, further comprising:

a sensor for detecting the position and orientation of the body relative to an initial position and orientation of the body, said sensor coupled to the actuators;

an angle sensor coupled to the steering shaft for detecting steering angles of each driving unit; and operating means for calculating an angular velocity ratios of the driving wheels for each driving unit based on the detected position and orientation of the body, the detected steering angles of each driving unit, and the reference trajectory of the vehicle.

14. An omnidirectional vehicle comprising:

a body; and a driving unit including:
- a chassis;
- a pair of driving wheels each having a center and serving as steering wheels, each of the driving wheels being mounted on wheel shafts, the wheel shafts being aligned and being axially supported to the chassis;
- a pair of first actuators for rotating the driving wheels;
- a steering shaft rotatably supporting the wheel shafts through the chassis;
- a shaft stub rotatably supported by the body of the vehicle, the shaft stub having a center and holding a steering shaft vertically at a position that the center of the shaft stub is horizontally displaced from the center of each of the driving wheels;

a second actuator for rotating the steering wheels;

a receiver associated with the actuators, for receiving a command; and a controller capable of transmitting the command to control an angular velocity of each of the driving wheels so that a velocity of the driving unit, obtained by synthesizing a forward traveling velocity in the forward direction and a lateral traveling velocity in the lateral direction, at a steering shaft reference point coincides with a pose direction of the drive unit calculated based on a reference trajectory, the forward traveling velocity being determined by the angular velocity of the driving wheels and the lateral traveling velocity being determined by the pair of first actuators independently driven to generate a translational velocity and an angular rotational velocity of the chassis, the controller for controlling an angular rotational velocity so that the pose direction of the body coincides with a given target pose direction by correcting the angular rotational velocity of the chassis by driving the second actuator.

15. The omnidirectional vehicle of claim 14, further comprising at least one additional driving unit.

* * * * *

UNITED STATES PATENT AND TRADEMARK OFFICE
CERTIFICATE OF CORRECTION

PATENT NO. : 5,924,512
DATED : July 20, 1999
INVENTOR(S) : Masayoshi WADA

It is certified that error appears in the above-identified patent and that said Letters Patent is hereby corrected as shown below:

Claim 6, Column 17, line 55, "the end" should read --an end--.

Signed and Sealed this

First Day of February, 2000

Attest:

Q. TODD DICKINSON

*Attesting Officer*  *Acting Commissioner of Patents and Trademarks*